US007379810B2

(12) United States Patent
Soga et al.

(10) Patent No.: US 7,379,810 B2
(45) Date of Patent: May 27, 2008

(54) ENGINE CONTROL SYSTEM AND ENGINE CONTROL METHOD

(75) Inventors: Tsutomu Soga, Kariya (JP); Kazuo Kojima, Nagoya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/643,927

(22) Filed: Dec. 22, 2006

(65) Prior Publication Data

US 2007/0156322 A1 Jul. 5, 2007

(30) Foreign Application Priority Data

Dec. 22, 2005 (JP) ............................ 2005-369983

(51) Int. Cl.
*B60T 7/12* (2006.01)
*F02M 7/00* (2006.01)

(52) U.S. Cl. ...................... 701/104; 123/480; 123/351; 123/399; 123/673; 701/105

(58) Field of Classification Search ................ 701/101, 701/103, 104, 105, 114, 115; 123/351, 361, 123/399, 673, 704, 480, 482, 488
See application file for complete search history.

(56) References Cited

U.S. PATENT DOCUMENTS 4,562,814 A * 1/1986 Abo et al. .................. 123/488
4,590,564 A * 5/1986 Ishikawa et al. ............ 701/110
4,718,388 A * 1/1988 Kiuchi ....................... 123/478
5,390,644 A 2/1995 Nunogaki et al.
5,699,778 A * 12/1997 Muraguchi et al. ......... 123/698
5,970,947 A * 10/1999 Iida et al. ................... 123/295
6,102,003 A * 8/2000 Hyodo et al. ............... 123/436
6,173,703 B1 1/2001 Matsumoto
7,200,486 B2 * 4/2007 Tanaka et al. .............. 701/109
2001/0039938 A1 * 11/2001 Machida et al. ............ 123/396
2002/0104520 A1 * 8/2002 Nakasaka et al. ........... 123/673

FOREIGN PATENT DOCUMENTS

JP 05-052152 3/1993
JP 05-179922 7/1993
JP 05-231209 9/1993
JP 05-288107 11/1993
JP 08-246965 9/1996
JP 10-317936 12/1998
JP 2000-257486 9/2000

* cited by examiner

*Primary Examiner*—John T. Kwon
(74) *Attorney, Agent, or Firm*—Nixon & Vanderhye P.C.

(57) ABSTRACT

An engine control system and an engine control method are disclosed wherein a combustible component quantity of intake air, reflecting combustible components in a crankcase of an engine, is calculated on the basis of a deviation between basic injection quantity for a target rotational speed to be attained and an actual injection quantity during operation to perform idling stabilizing control. A ratio of the combustible components mixed to engine oil is calculated on the basis of the combustible component quantity of intake air and a temperature of engine oil. During a status of the engine with a given temperature of engine oil and the mixing ratio of the combustible components in engine oil, a fuel injection affect eliminating operation is executed.

32 Claims, 16 Drawing Sheets

ENGINE CONTROL SYSTEM AND ENGINE CONTROL METHOD

CROSS REFERENCE TO RELATED APPLICATIONS

This application is related to Japanese Patent Application No. 2005-369983, filed on Dec. 22, 2005, the content of which is hereby incorporated by reference.

BACKGROUND OF THE INVENTION

1. Technical Field of the Invention

The present invention relates to engine control devices for controlling internal combustion engines and, more particularly, to an engine control system and an engine control method having a function to detect or calculate a combustible component quantity of intake air of an internal combustion engine.

2. Description of the Related Art

In the related art, attempts have heretofore been made to provide an internal combustion engine having a combustion chamber supplied with intake air containing fresh air and fuel components such as evaporative fuel delivered from a fuel tank or blow-by gas ejecting from a crankcase. As such fuel components increase in intake air drawn to a combustion chamber of the engine, these fuel components results in an increase in a total volume of fuel in an air/fuel mixture to be prepared in the combustion chamber and, thus, the air/fuel mixture becomes too rich, causing a deterioration in control accuracy of an output of the engine. Thus, a need arises to correctly detect or calculate a combustible component quantity of intake air drawn to the combustion engine and take appropriate measures against such defective control accuracy.

To address such an issue, an internal combustion engine has been proposed with a structure having a canister connected between a fuel tank and an intake air passage through a purge passage incorporating a purge control valve (see, for example, Japanese Unexamined Patent Publication No. 5-288107). The opening degree of the purge control valve is controlled to vary a flow passage area between the fuel tank and the intake air passage. With such a structure, a concentration of evaporative gas in intake air is detected on the basis of the amount of displacement of the purge control valve operated in feedback control of an air/fuel mixture at stages in fore and aft movements of the purge control valve.

With such a control device, however, it is hard to detect a combustible component quantity of intake air resulting from combustible components contained in blow-by gas ejected from the crankcase. The presence of the combustible components in intake air is caused by an increase of combustible components coming from the combustion chamber into the crankcase. As the combustible components increase in the crankcase in volume, the amount of combustible components increases in intake air of the engine. In addition, the presence of the combustible components causes a dilution of engine oil in the crankcase, resulting in a lubrication defect between a cylinder wall surface of the engine and a piston. Thus, a need arises detecting or calculating a combustible component quantity of intake air resulting from the combustible components in the crankcase.

SUMMARY OF THE INVENTION

The present invention has been completed with a view to addressing the above issue and has an object to provide an engine control system and an engine control method that can appropriately detect or calculate a combustible component quantity of intake air resulting from combustible components in a crankcase of an engine and appropriately detect or calculate a ratio of the combustible components mixed to engine oil.

To achieve the above object, the present invention provides an engine control system for controlling an engine having an intake air system through which air is drawn, a fuel injection valve for performing fuel injection to supply fuel into a combustion chamber, and a crankcase filled with engine oil. The engine control system comprises detecting means for detecting at least one of an output of the engine and a status correlated to the output to provide a detected value, calculating means for calculating a combustible component quantity of intake air, resulting from combustible components prevailing in the crankcase, on the basis of the detected value and providing a commanded fuel injection quantity depending on the detected value, and controlling means for controlling the fuel injection valve depending on the commanded fuel injection quantity so as to perform the fuel inject to supply fuel into the combustion chamber to allow the engine to provide a demanded output. The calculating means includes fuel injection affect eliminating means for eliminating an adverse affect on the calculation result of the combustible component quantity resulting from fuel injected to the combustion chamber by the fuel injection valve in response to the commanded fuel injection quantity.

During operation of the engine, the combustible components in intake air combusts in the combustion chamber generating the output of the engine. Thus, the output of the engine has a correlation with the combustible components in intake air. Therefore, the combustible component quantity, resulting from the combustible components in the crankcase of the engine, also has a correlation with the output of the engine. With the structure of the engine control system set forth above, the combustible component quantity of intake air can be calculated on the basis of the output of the engine upon eliminating an adverse affect arising from fuel injected to the combustion engine through the fuel injection valve, thereby making it possible to appropriately calculate the combustible component quantity of intake air resulting from the combustible components in the crankcase of the engine.

Here, the combustible component quantity of intake air, resulting from the combustible components in the crankcase, includes not only the combustible component quantity of intake air resulting from the combustible components in the crankcase but also a quantity of fuel evaporated from engine oil when engine oil is used in an area outside the crankcase as lubricating oil.

With the engine control system, the detecting means may comprise a sensor for detecting a rotational state of the engine, and the calculating means may calculate the combustible component quantity on the basis of a deviation between an actual operation quantity of the fuel injection valve, required for the rotational state of the engine to be feedback controlled to a target rotational state, and a basic operation quantity of the fuel injection valve.

With the structure set forth above, a deviation is deemed to occur in the fuel injection valve between a basic operating value and an actual operating value, appearing when regulating a detected rotational state of the engine to a targeted rotational speed in feedback control, due to the combustible component quantity of intake air resulting from the combustible components in the crankcase. With the structure of the engine control system described above, the combustible component quantity of intake air, resulting from the combustible components in the crankcase, can be properly calculated on the basis of such a deviation between the basic operating value and the actual operating value of the fuel injection valve upon eliminating the adverse affect arising from fuel injection. In other words, in calculating the combustible component quantity of intake air on the ground that the rotational state of the engine matches the targeted rotational state, such a basic operating value is regarded to be an adverse affect factor arising from fuel injection through the fuel injection valve and such an adverse affect can be eliminated. The fuel injection affect eliminating means has information on such a basic operating value for use in comparison with the actual operating value.

With the present embodiment, the engine control system may further comprises learning means for learning a learning value for compensating variation in an injection characteristic of the fuel injection valve, and the calculating means renders the controlling means operative to operate the fuel injection valve using the learning value during feedback control.

If variation takes place in injecting characteristics of fuel injection valve due to individual differences, an actual injection quantity, arising from the operation of the fuel injection valve, deviates from a theorized injection quantity, causing a discrepancy to occur between the operating value of the fuel injection valve, effectuated in feedback control, and the basic operating value. Such a discrepancy causes a fear of the occurrence of a drop in an accuracy of calculating the combustible component quantity of intake air resulting from the combustible components in the crankcase. With the present embodiment, mentioned above, using the learning value enables the actual operating valve of the fuel injection valve to match the theorized injection quantity. This results in a capability of calculating the combustible component quantity of intake air reflecting the combustible components in the crankcase on the basis of the deviation between the basic injection quantity and the actual injection quantity effectuated by the fuel injection valve.

With the engine control system of the present embodiment, the engine may comprise a diesel engine, and wherein the controlling means comprises means for permitting the fuel injection valve to execute a main fuel injection for obtaining a demanded torque and an aft fuel injection subsequent to the main injection. The learning means may obtain the learning value during a period from time at which the engine oil of the diesel engine is replaced to time at which the subsequent fuel injection is executed. The calculating means may continuously use the learning value during a period in which the replaced engine oil is under use.

With the structure mentioned above, the electronic control system comprises means for permitting the fuel injection valve to execute the main fuel injection for obtaining the demanded torque and the aft fuel injection subsequent to the main injection. The aft injection, subsequent to the main injection, is remarkably lagged in timing sometimes with respect to a top dead center of a piston of the diesel engine. With fuel injected at the remarkably lagged timing, injected fuel is liable to adhere onto a cylinder wall surface of the combustion chamber. The piston scrapes fuel off the cylinder wall surface causing fuel to be mixed to engine oil in the crankcase. As fuel is mixed to engine oil in the crankcase, a stream of blow-by gas passes from the crankcase to join a stream of intake air passing through the intake air system, causing an increase in the combustible component quantity of intake air arising from such fuel contained in the blow-by gas stream.

Thus, the learning value, subsequently learned with the learning means, contains not only an adverse affect arising from the variation in injecting characteristics of the fuel injection valve but also an adverse affect of the combustible components in intake air resulting from fuel contained in the blow-by gas stream. Therefore, if the combustible component quantity of intake air resulting from the combustible components in the crankcase is calculated by performing fuel injection with the use of such a learned value, a probability takes place with the occurrence of deterioration in accuracy of calculating the combustible component quantity of intake air.

In contrast, if the learning value, appearing when almost no fuel is mixed to engine oil after engine oil has been replaced with new one, is learned, the engine control system can learn the learning value with almost no combustible components present in the crankcase. This learning value has a high accuracy as an effective value for compensating the deteriorated calculation arising from the variation in the injecting characteristics of the fuel injection valve due to individual differences thereof. Using such a learning value enables the combustible component quantity of intake air reflecting the combustible components in the crankcase to be calculated in a further increased precision.

With the engine control system of the present embodiment, the detecting means may comprise at least one of means for detecting an oxygen concentration of oxygen in exhaust gas of the engine, means for detecting a temperature of the exhaust gas of the engine and means for detecting an internal pressure of the combustion chamber.

If a stream of intake air contains the combustible components reflecting the combustible components in the crankcase, the presence of the combustible components in intake air causes a total amount of fuel in the combustion chamber to be adversely affected. Thus, the presence of the combustible components in intake air results in a further increase in the total amount of fuel in the combustion chamber than a theorized amount of fuel, being injected to the combustion chamber through the fuel injection valve, which is determined on the basis of the output of the engine.

Thus, such a variation in the amount of fuel in the combustion chamber results in changes in a concentration of oxygen in exhaust gas, temperature of exhaust gas and an in-cylinder pressure of the combustion chamber correlated to the output of the engine.

With the structure of the present embodiment set forth above, the engine control system can calculate the combustible component quantity of intake air, reflecting the combustible components in the crankcase, on the basis of factors correlated to the output of the engine.

With the engine control system of the present embodiment, the injection affect eliminating means may comprise initiating means for permitting the calculating means to perform calculation when the controlling means inactivate the fuel injection valve to stop injecting the fuel.

With such a structure, the calculating means is enabled to initiate the calculation when fuel is cut off. This results in a capability of calculating the combustible component quantity of intake air, reflecting the combustible components in the crankcase, in a highly simple and appropriate manner without suffering from an adverse affect of fuel injected to the combustion chamber with the resultant leakage to the crankcase.

In addition, with the engine composed of a gasoline engine, during the operation of the detecting means to detect the engine parameters for use in the calculation of the calculating means, an ignition plug may be preferably activated to initiate ignition on fuel in the combustion chamber even if the gasoline remains under a fuel-cut-off mode.

With the engine control system of the present embodiment mentioned above, the detecting means may comprise at least one of means for detecting a rotational state of the engine, means for detecting an oxygen concentration of oxygen in exhaust gas of the engine, means for detecting a temperature of the exhaust gas of the engine and means for detecting an internal pressure of the combustion chamber, and the calculating means may perform the calculation on the basis of a deviation between the detected value of the detecting means, theorized when the fuel injection is stopped, and a relevant actually detected value.

With such a structure set forth above, the engine control system can reliably calculate the combustible component quantity of intake air, reflecting the combustible components in the crankcase, on the basis of the detected value of the detecting means when the fuel injection is halted. Here, with intake air containing the combustible components resulting from the combustible components in the crankcase, intake air containing the combustible components is drawn into the combustion chamber wherein combustion of the combustible components takes place.

If the combustible components combust in the combustion chamber regardless of a status in the fuel cut-off mode of the engine, variations occur in the output engine such as a rotational state of the engine, a concentration of oxygen in exhaust gas and temperatures of exhaust gas and a status, such as a pressure of the combustion chamber, which is correlated to the output of the engine.

Moreover, with a structure of the engine incorporating an exhaust system equipped with a catalyst, the fuel components remaining in exhaust gas are subjected to oxidizing reaction in the catalyst causing an increase in the temperature of exhaust gas at an area downstream of the catalyst even with no combustion taking place in the combustion chamber.

With such a structure of the present embodiment set forth above, the engine control system allows the calculating means to calculate the combustible component quantity of intake air, reflecting the combustible components in the crankcase, on the basis of the deviation between the detected value on such outputs of the engine, theorized when the combustible component quantity of intake air, reflecting the combustible components in the crankcase, is zeroed and the relevant actually detected value.

With the engine control system of the present embodiment, the engine may comprise a supercharger and the detecting means may comprise means for detecting a pressure of the intake air system of the engine. The calculating means may calculate the combustible component quantity on the basis of an amount of rise of a detected pressure on the pressure of the intake air system theorized when the fuel injection is stopped.

With such a structure described above, the combustible component quantity of intake air, reflecting the combustible components in the crankcase, can be calculated on the basis of the detected value when the fuel injection is stopped. Here, when intake air contains the combustible component quantity of intake air reflecting the combustible components in the crankcase, a probability takes place for the combustible components to combust in the combustion chamber of the engine. With the combustible components of intake air subjected to the combustion, the rotational speed of the engine increases with the resultant in crease in a volume of exhaust gas. This results in an increase in a super-charging pressure created by the super charger to a higher level than that achieved in the absence of the combustible components of intake air resulting from the combustible components in the crankcase.

With the structure of the present embodiment set forth above, the engine control system can calculate the combustible component quantity of intake air reflecting the combustible components in the crankcase on the basis of such an increase in the super-charging pressure.

With the engine control system of the present embodiment, the engine may comprise a diesel engine.

The diesel engine has the least evaporating rate of fuel in comparison to that of fuel in a gasoline engine. With the engine composed of the diesel engine like the structure mentioned above, therefore, an evaporative fuel affect eliminating means can be appropriately structured for eliminating an adverse affect arising from evaporative fuel coming from the crankcase from which fuel is supplied to the fuel injection valve.

With the engine control system of the present embodiment, the engine may comprise a gasoline engine having an intake air passage communicating with a fuel tank, a canister disposed between the fuel tank and the combustion chamber for collecting evaporative fuel, and a purge control valve operative to regulate a flow passage area between the canister and the intake system. The calculating means may perform the calculation when the purge control valve is closed.

With such a structure mentioned above, the combustible component quantity of intake air reflecting the combustible components in the crankcase can be calculated on the basis of the detected value of the detecting means appearing when the purge control valve is shut off to block the flow of evaporative fuel from the canister to the intake air system of the engine. Thus, the evaporative fuel affect eliminating means can be appropriately structured for preventing evaporative fuel, coming from the crankcase from which fuel is supplied to the fuel injection valve, from adversely affecting the calculation result mentioned above.

With the engine control system of the present embodiment set forth above, the engine may comprise an exhaust gas recirculation system for recirculating exhaust gas to the intake air system, and an actuator for regulating an amount of exhaust gas recirculated to the intake air system through the exhaust gas recirculation system. The calculating means may further include exhaust gas affect eliminating means for preventing recirculated exhaust gas from adversely affecting the calculation result on the basis of an operational state of the actuator.

With the structure set forth above, since the engine control system includes the means for recirculating exhaust gas, ejected to the exhaust gas system from the combustion chamber, to the intake air system, intake air contains recirculated exhaust gas. This causes intake air to contain unburned fuel prevailing in recirculated exhaust gas. This unburned fuel results in a factor to cause a drop in a calculating accuracy when executing the calculation of the combustible component quantity of intake air.

With the structure of the present embodiment, the adverse affect arising from recirculated exhaust gas can be eliminated by using a status of the actuator for regulating the flow rate of exhaust gas to be recirculated, enabling the appropriate suppression of a drop in the calculating accuracy.

With the engine control system of the present embodiment set forth above, the exhaust gas affect eliminating means may allow the calculating means to perform the calculation on the basis of the detected value of the detecting means appearing when the amount of exhaust gas recirculated is zeroed upon operation of the actuator.

With such a structure described above, causing the calculating means to perform the calculation when the amount of recirculated gas is zeroed enables the exhaust gas affect eliminating means to be simply and appropriately formed.

With the engine control system of the present embodiment, the detecting means may comprise means for detecting at least one of a temperature of the engine oil and a corresponding value representing the temperature of the engine oil to provide a temperature detection value. The calculating means may further include means for calculating at least one of a mixing ratio of combustible components, mixed to the engine oil, and a corresponding value representing the mixing ratio on the basis of the combustible component quantity, calculated by the calculating means, and the temperature detection value.

The ratio of the combustible components mixed to engine oil has a correlation with the combustible component quantity of intake air from which injected fuel or evaporative fuel from the fuel tank are excluded. Such a correlation is not uniquely determined and varies depending on the temperatures of engine oil. That is the correlation varies such that the higher the temperature of engine oil, the greater will be the combustible component quantity of intake air.

With the structure of the present embodiment set forth above, the ratio of the combustible components mixed to engine oil can be properly calculated on the basis of the combustible component quantity calculated by the calculating means and the temperature of engine oil.

With the engine control system set forth above, the controlling means may be operative to execute at least one of a first step of increasing an amount of intake air drawn to the combustion chamber, a second step of increasing a temperature of the engine oil, a third step of limiting the fuel injection quantity and a fourth step of regulating at timing, at which the fuel injection valve executes the fuel injection, on the basis of at least one of the mixing ratio of the combustible components, the temperature of the engine oil and the corresponding value representing the temperature of the engine oil for thereby preventing an increase in a quantity of combustible components in the engine oil.

As the ratio of the combustible components mixed to engine oil increases, there is a fear of the occurrence of troubles wherein the output of the engine unintentionally increases and the lubrication defect of engine oil is caused. Therefore, the operation may be preferably executed to minimize the mixing of the combustible components to engine oil before the ratio of the combustible components mixed to engine oil increases to the extent that causes the troubles mentioned above. In addition, the mixing ratio of the combustible components at which the troubles are encountered varies depending on the temperatures of engine oil.

With the structure of the present embodiment, the operation can be executed to minimize the mixing of the combustible components to engine oil before the engine encounters a situation with the troubles mentioned above.

That is, with the structure set forth above, increasing the flow rate (quantity) of intake air results in an increase in the rate of evaporation of the combustible components in engine oil with the resultant promotion of decreasing the combustible component quantity of engine oil. Further, increasing the temperature of engine oil results in an increase of the combustible components evaporated from engine oil with the resultant reduction of the combustible component quantity of engine oil. Furthermore, limiting the rate of fuel being injected enables the suppression of an increase of the amount of fuel flowing into the crankcase. This provides a capability of causing the combustible component quantity of engine oil to be lower than that theorized when the rate of fuel injection is not limited. Moreover, advancing timing at which fuel injection is initiated enables fuel to be prevented from adhering onto the cylinder wall surface of the engine to flow into the crankcase. This provides a capability of causing the combustible component quantity of engine oil to be lower than that theorized when fuel injection timing is not advanced. In addition, the operations may be preferably executed to limit the fuel injection quantity or advance fuel injection timing during post injection under a circumstance where the engine comprises a diesel engine.

With the engine control system of the present embodiment, the controlling means may be operative to execute at least one of a first step of limiting a rotational speed of the engine and a second step of limiting an output torque of the engine on the basis of at least one of the mixing ratio of the combustible components, the temperature of the engine oil and the corresponding value representing the temperature of the engine oil for thereby taking a measure against a lubrication defect of the engine oil.

As set forth above, with the combustible components mixed to engine oil at the increased rate, there is a fear of the lubrication defect of engine oil. This results in risks with the occurrence of engine seizing between the cylinder wall surface and the piston. Meanwhile, lubricating performance of engine oil is not uniquely determined on the basis of mere mixing ratio of the combustible components in engine oil and varies depending on the temperature of engine oil. This is due to the fact that engine oil has a viscosity varying depending on the temperatures of engine oil.

With the structure of the present embodiment, upon limiting the rotational state of the engine on the basis of the mixing ratio of the combustible components and at least one of the temperatures of engine oil and a corresponding value representing the temperatures of engine oil, the temperatures of engine oil and a corresponding value representing the temperatures of engine oil, the occurrence of engine seizing can be suppressed even when deterioration takes place in lubricating performance. In addition, with the structure set forth above, limiting output torque of the engine allows a reduction in the temperatures of engine oil. This enables engine oil to have increased viscosity with the resultant capability of suppressing the lubrication defect.

Moreover, in view of the seizing occurring between the cylinder wall surface and the piston, lubricating performance depends on the temperature between the cylinder and the piston. Therefore, temperatures of coolant water of the engine may be preferably used as the corresponding value of engine oil.

With the engine control system of the present embodiment, the controlling means may be operative to limit at least one of an intake air quantity of the engine and a fuel injection quantity on the basis of the mixing ratio of the combustible components and at least one of the temperature of the engine oil and the corresponding value representing the temperature of the engine oil for thereby suppressing an excess of an output torque of the engine.

As set forth above, as the ratio of the combustible components mixed to engine oil increases, the combustible component quantity of intake air increases with the resultant fear of the engine providing an excess rate of engine torque. Meanwhile, the combustible component quantity of intake air is not uniquely determined on the basis of only the mixing ratio of the combustible components and increases as the temperature of engine oil increases.

With the structure of the present embodiment described above, excessive output torque of the engine can be suppressed on the basis the mixing ratio of the combustible components and at least one of the temperatures of engine oil and the corresponding value. That is, with the engine comprising a diesel engine, the fuel injection quantity is limited. With the engine comprising a gasoline engine, the flow rate of intake air and fuel injection quantity (with the flow rate of intake air employed in a preferred mode) are limited. With such operations, excessive output torque of the engine can be suppressed.

Another aspect of the present invention provides a method of controlling an engine having an intake air system through which air is drawn, a fuel injection valve for performing fuel injection to supply fuel into a combustion chamber, and a crankcase filled with engine oil, the method comprising the steps of detecting at least one of an output of the engine and a status correlated to the output to provide a detected value, calculating a combustible component quantity of intake air, resulting from combustible components prevailing in the crankcase, on the basis of the detected value and providing a commanded fuel injection quantity depending on the detected value, and controlling the fuel injection valve depending on the commanded fuel injection quantity so as to perform the fuel inject to supply fuel into the combustion chamber to allow the engine to provide a demanded output. The step of calculating the combustible component quantity includes eliminating a fuel injection adverse affect on the calculation result of the combustible component quantity resulting from fuel injected to the combustion chamber by the fuel injection valve in response to the commanded fuel injection quantity.

During operation of the engine, the combustible components in intake air combusts in the combustion chamber generating the output of the engine. Thus, the output of the engine has a correlation with the combustible components in intake air. Therefore, the combustible component quantity, resulting from the combustible components in the crankcase of the engine, also has a correlation with the output of the engine. With the method of controlling the engine set forth above, the combustible component quantity of intake air can be calculated on the basis of the output of the engine upon eliminating an adverse affect arising from fuel injected to the combustion engine, thereby making it possible to appropriately calculate the combustible component quantity of intake air resulting from the combustible components in the crankcase of the engine.

Here, the combustible component quantity of intake air, resulting from the combustible components in the crankcase, includes not only the combustible component quantity of intake air resulting from the combustible components in the crankcase but also a quantity of fuel evaporated from engine oil when engine oil is used in an area outside the crankcase as lubricating oil.

With the method of controlling the engine, the step of detecting the engine parameters may comprise detecting a rotational state of the engine, and the step of calculating the combustible component quantity of intake air comprising calculating the combustible component quantity on the basis of a deviation between an actual operation quantity of the fuel injection valve, required for the rotational state of the engine to be feedback controlled to a target rotational state, and a basic operation quantity of the fuel injection valve.

With the method of controlling the engine set forth above, a deviation is deemed to occur in the fuel injection valve between a basic operating value and an actual operating value, appearing when regulating a detected rotational state of the engine to a targeted rotational speed in feedback control, due to the combustible component quantity of intake air resulting from the combustible components in the crankcase. With the method of controlling the engine described above, the combustible component quantity of intake air, resulting from the combustible components in the crankcase, can be properly calculated on the basis of such a deviation between the basic operating value and the actual operating value of the fuel injection valve upon eliminating the adverse affect arising from fuel injection. In other words, in calculating the combustible component quantity of intake air on the ground that the rotational state of the engine matches the targeted rotational state, such a basic operating value is regarded to be an adverse affect factor arising from fuel injection through the fuel injection valve and such an adverse affect can be eliminated.

In the present invention, the method of controlling the engine may further comprise the step of learning a learning value for compensating variation in an injection characteristic of the fuel injection valve. The step of controlling the fuel injection valve allows the fuel injection valve to be opened using the learning value during feedback control.

If variation takes place in injecting characteristics of fuel injection valve due to individual differences, an actual injection quantity, arising from the operation of the fuel injection valve, deviates from a theorized injection quantity, causing a discrepancy to occur between the operating value of the fuel injection valve, effectuated in feedback control, and the basic operating value. Such a discrepancy causes a fear of the occurrence of a drop in an accuracy of calculating the combustible component quantity of intake air resulting from the combustible components in the crankcase. With the method mentioned above, mentioned above, using the learning value enables the actual operating valve of the fuel injection valve to match the theorized injection quantity. This results in a capability of calculating the combustible component quantity of intake air reflecting the combustible components in the crankcase on the basis of the deviation between the basic injection quantity and the actual injection quantity effectuated by the fuel injection valve.

With the method of controlling the engine of the present embodiment, the engine may comprise a diesel engine, and wherein the step of controlling the fuel injection valve allows the fuel injection valve to execute a main fuel injection for obtaining a demanded torque and an aft fuel injection subsequent to the main injection. The step of learning the learning value allows the learning value to be obtained during a period from time at which the engine oil of the diesel engine is replaced to time at which the subsequent fuel injection is executed. The step of calculating the combustible component quantity of intake air continuously uses the learning value during a period in which the replaced engine oil is under use.

With the method of controlling the engine mentioned above, the operations are executed to perform the main fuel injection for obtaining the demanded torque and the aft fuel injection subsequent to the main injection. The aft injection, subsequent to the main injection, is remarkably lagged in timing sometimes with respect to a top dead center of a piston of the diesel engine. With fuel injected at the remarkably lagged timing, injected fuel is liable to adhere onto a cylinder wall surface of the combustion chamber. The piston scrapes fuel off the cylinder wall surface causing fuel to be mixed to engine oil in the crankcase. As fuel is mixed to engine oil in the crankcase, a stream of blow-by gas passes from the crankcase to join a stream of intake air passing through the intake air system, causing an increase in the combustible component quantity of intake air arising from such fuel contained in the blow-by gas stream.

Thus, the learning value contains not only an adverse affect arising from the variation in injecting characteristics of the fuel injection valve but also an adverse affect of the combustible components in intake air resulting from fuel contained in the blow-by gas stream. Therefore, if the combustible component quantity of intake air resulting from the combustible components in the crankcase is calculated by performing fuel injection with the use of such a learned value, a probability takes place with the occurrence of deterioration in accuracy of calculating the combustible component quantity of intake air.

In contrast, if the learning value, appearing when almost no fuel is mixed to engine oil after engine oil has been replaced with new one, is learned, the method of controlling the engine enables the learning value with almost no combustible components present in the crankcase to be learned. This learning value has a high accuracy as an effective value for compensating the deteriorated calculation arising from the variation in the injecting characteristics of the fuel injection valve due to individual differences thereof. Using such a learning value enables the combustible component quantity of intake air reflecting the combustible components in the crankcase to be calculated in a further increased precision.

With the method of controlling the engine of the present embodiment, the step of detecting the engine parameters may comprise at least one of detecting an oxygen concentration of oxygen in exhaust gas of the engine, detecting a temperature of the exhaust gas of the engine, and detecting an internal pressure of the combustion chamber.

If a stream of intake air contains the combustible components reflecting the combustible components in the crankcase, the presence of the combustible components in intake air causes a total amount of fuel in the combustion chamber to be adversely affected. Thus, the presence of the combustible components in intake air results in a further increase in the total amount of fuel in the combustion chamber than a theorized amount of fuel, being injected to the combustion chamber through the fuel injection valve, which is determined on the basis of the output of the engine.

Thus, such a variation in the amount of fuel in the combustion chamber results in changes in a concentration of oxygen in exhaust gas, temperature of exhaust gas and an in-cylinder pressure of the combustion chamber correlated to the output of the engine.

With the method of controlling the engine of the present embodiment set forth above, the combustible component quantity of intake air, reflecting the combustible components in the crankcase, can be calculated on the basis of factors correlated to the output of the engine.

With the method of controlling the engine, the step of eliminating an adverse affect on the calculation result of the combustible component quantity may comprise permitting the step of calculating the combustible component quantity to be executed when the fuel injection valve is made inoperative to stop injecting the fuel.

With such a method of controlling the engine, the operation is executed to calculate the combustible component quantity of intake air when fuel is cut off. This results in a capability of calculating the combustible component quantity of intake air, reflecting the combustible components in the crankcase, in a highly simple and appropriate manner without suffering from an adverse affect of fuel injected to the combustion chamber with the resultant leakage to the crankcase.

In addition, with the engine composed of a gasoline engine, during the operation to detect the engine parameters for use in the calculation, an ignition plug may be preferably activated to initiate ignition on fuel in the combustion chamber even if the gasoline remains under a fuel-cut-off mode.

With the method of controlling the engine, the step of detecting the engine parameters may comprise at least one of detecting a rotational state of the engine, detecting an oxygen concentration of oxygen in exhaust gas of the engine, detecting a temperature of the exhaust gas of the engine, and detecting an internal pressure of the combustion chamber, and the step of calculating the combustible component quantity of intake air may be executed on the basis of a deviation between the detected value, theorized when the fuel injection is stopped, and a relevant actually detected value.

With such a method of controlling the engine set forth above, the combustible component quantity of intake air, reflecting the combustible components in the crankcase, can be reliably calculated on the basis of the detected value initiated when the fuel injection is halted. Here, with intake air containing the combustible components resulting from the combustible components in the crankcase, intake air containing the combustible components is drawn into the combustion chamber wherein combustion of the combustible components takes place.

If the combustible components combust in the combustion chamber regardless of a status in the fuel cut-off mode of the engine, variations occur in the output engine such as a rotational state of the engine, a concentration of oxygen in exhaust gas and temperatures of exhaust gas and a status, such as a pressure of the combustion chamber, which is correlated to the output of the engine.

Moreover, with the engine incorporating an exhaust system equipped with a catalyst, the fuel components remaining in exhaust gas are subjected to oxidizing reaction in the catalyst causing an increase in the temperature of exhaust gas at an area downstream of the catalyst even with no combustion taking place in the combustion chamber.

With such a method of controlling the engine set forth above, the combustible component quantity of intake air, reflecting the combustible components in the crankcase, can be calculated on the basis of the deviation between the detected value on such outputs of the engine, theorized when the combustible component quantity of intake air, reflecting the combustible components in the crankcase, is zeroed and the relevant actually detected value.

With the method of controlling the engine, the engine may comprise a supercharger. The step of detecting the engine parameters may comprise detecting a pressure of the intake air system of the engine, and the step of calculating the combustible component quantity of intake air may be executed to calculate the combustible component quantity on the basis of an amount of rise of a detected pressure on the pressure of the intake air system theorized when the fuel injection is stopped.

With such a method of controlling the engine described above, the combustible component quantity of intake air, reflecting the combustible components in the crankcase, can be calculated on the basis of the detected value when the fuel injection is stopped. Here, when intake air contains the combustible component quantity of intake air reflecting the combustible components in the crankcase, a probability takes place for the combustible components to combust in the combustion chamber of the engine. With the combustible components of intake air subjected to the combustion, the rotational speed of the engine increases with the resultant in crease in a volume of exhaust gas. This results in an increase in a super-charging pressure created by the super charger to a higher level than that achieved in the absence of the combustible components of intake air resulting from the combustible components in the crankcase.

With the method of controlling the engine set forth above, the combustible component quantity of intake air reflecting the combustible components in the crankcase can be calculated on the basis of such an increase in the super-charging pressure.

With the method of controlling the engine, the engine may comprise a diesel engine.

The diesel engine has the least evaporating rate of fuel in comparison to that of fuel in a gasoline engine. With the engine composed of the diesel engine, therefore, an evaporative fuel affect eliminating operation can be appropriately executed for eliminating an adverse affect arising from evaporative fuel coming from the crankcase from which fuel is supplied to the fuel injection valve.

With the method of controlling the engine, the engine may comprise a gasoline engine having an intake air passage communicating with a fuel tank, a canister disposed between the fuel tank and the combustion chamber for collecting evaporative fuel, and a purge control valve operative to regulate a flow passage area between the canister and the intake system. The step of calculating the combustible component quantity of intake air may be executed when the purge control valve is closed.

With such a method of controlling the engine mentioned above, the combustible component quantity of intake air reflecting the combustible components in the crankcase can be calculated on the basis of the detected value appearing when the purge control valve is shut off to block the flow of evaporative fuel from the canister to the intake air system of the engine. Thus, the evaporative fuel affect eliminating operation can be appropriately executed for preventing evaporative fuel, coming from the crankcase from which fuel is supplied to the fuel injection valve, from adversely affecting the calculation result mentioned above.

In the present invention, the method of controlling the engine may further comprise the steps of recirculating exhaust gas, exhausted from the combustion chamber, to the intake air system, regulating an amount of exhaust gas to be recirculated to the intake air system, and the step of calculating the combustible component quantity of intake air comprises eliminating an adverse affect of the recirculated exhaust gas on the calculation result on the basis of the regulated amount of the exhaust gas.

With the method of controlling the engine set forth above, since exhaust gas, ejected to the exhaust gas system from the combustion chamber, is recirculated to the intake air system, intake air contains recirculated exhaust gas. This causes intake air to contain unburned fuel prevailing in recirculated exhaust gas. This unburned fuel results in a factor to cause a drop in a calculating accuracy when executing the calculation of the combustible component quantity of intake air.

With the method of controlling the engine set forth above, the adverse affect arising from recirculated exhaust gas can be eliminated by using a status of the actuator for regulating the flow rate of exhaust gas to be recirculated, enabling the appropriate suppression of a drop in the calculating accuracy.

With the method of controlling the engine, the step of eliminating an adverse affect on the calculation result of the combustible component quantity may allow the step of calculating the combustible component quantity to be executed on the basis of the detected value appearing when the amount of exhaust gas to be recirculated is zeroed.

With such a method of controlling the engine described above, the calculation of the combustible component quantity is executed on the basis of the detected value appearing when the amount of exhaust gas to be recirculated is zeroed. This results in increased accuracy of calculating the combustible component quantity of intake air.

With the method of controlling the engine, the step of detecting the engine parameters may comprise detecting at least one of a temperature of the engine oil and a corresponding value representing the temperature of the engine oil to provide a temperature detection value, and the step of calculating the combustible component quantity of intake air may comprise calculating at least one of a mixing ratio of combustible components, mixed to the engine oil, and a corresponding value representing the mixing ratio on the basis of the combustible component quantity and the temperature detection value.

The ratio of the combustible components mixed to engine oil has a correlation with the combustible component quantity of intake air from which injected fuel or evaporative fuel from the fuel tank are excluded. Such a correlation is not uniquely determined and varies depending on the temperatures of engine oil. That is the correlation varies such that the higher the temperature of engine oil, the greater will be the combustible component quantity of intake air.

With the method of controlling the engine set forth above, the ratio of the combustible components mixed to engine oil can be properly calculated on the basis of the combustible component quantity calculated by the calculating means and the temperature of engine oil.

With the method of controlling the engine, the step of eliminating the adverse affect on the calculation result of the combustible component quantity may comprise executing at least one of increasing an amount of intake air drawn to the combustion chamber, increasing a temperature of the engine oil, limiting the fuel injection quantity and regulating at timing, at which the fuel injection valve executes the fuel injection, on the basis of at least one of the mixing ratio of the combustible components, the temperature of the engine oil and the corresponding value representing the temperature of the engine oil for thereby preventing an increase in a quantity of combustible components in the engine oil.

As the ratio of the combustible components mixed to engine oil increases, there is a fear of the occurrence of troubles wherein the output of the engine unintentionally increases and the lubrication defect of engine oil is caused. Therefore, the operation may be preferably executed to minimize the mixing of the combustible components to engine oil before the ratio of the combustible components mixed to engine oil increases to the extent that causes the troubles mentioned above. In addition, the mixing ratio of the combustible components at which the troubles are encountered varies depending on the temperatures of engine oil.

With the structure of the present embodiment, the operation can be executed to minimize the mixing of the combustible components to engine oil before the engine encounters a situation with the troubles mentioned above.

That is, with the method of controlling the engine set forth above, increasing the flow rate (quantity) of intake air results in an increase in the rate of evaporation of the combustible components in engine oil with the resultant promotion of decreasing the combustible component quantity of engine oil. Further, increasing the temperature of engine oil results in an increase of the combustible components evaporated from engine oil with the resultant reduction of the combustible component quantity of engine oil. Furthermore, limiting the rate of fuel being injected enables the suppression of an increase of the amount of fuel flowing into the crankcase. This provides a capability of causing the combustible component quantity of engine oil to be lower than that theorized when the rate of fuel injection is not limited. Moreover, advancing timing at which fuel injection is initiated enables fuel to be prevented from adhering onto the cylinder wall surface of the engine to flow into the crankcase. This provides a capability of causing the combustible component quantity of engine oil to be lower than that theorized when fuel injection timing is not advanced. In addition, the operations may be preferably executed to limit the fuel injection quantity or advance fuel injection timing during post injection under a circumstance where the engine comprises a diesel engine.

With the method of controlling the engine, the step of eliminating the adverse affect on the calculation result of the combustible component quantity may comprise executing at least one of limiting a rotational speed of the engine and limiting an output torque of the engine on the basis of at least one of the mixing ratio of the combustible components, the temperature of the engine oil and the corresponding value representing the temperature of the engine oil for thereby taking a measure against a lubrication defect of the engine oil.

As set forth above, with the combustible components mixed to engine oil at the increased rate, there is a fear of the lubrication defect of engine oil. This results in risks with the occurrence of engine seizing between the cylinder wall surface and the piston. Meanwhile, lubricating performance of engine oil is not uniquely determined on the basis of mere mixing ratio of the combustible components in engine oil and varies depending on the temperature of engine oil. This is due to the fact that engine oil has a viscosity varying depending on the temperatures of engine oil.

With the method of controlling the engine, upon limiting the rotational state of the engine on the basis of the mixing ratio of the combustible components and at least one of the temperatures of engine oil and a corresponding value representing the temperatures of engine oil, the occurrence of engine seizing can be suppressed even when deterioration takes place in lubricating performance. In addition, with the method of controlling the engine set forth above, limiting output torque of the engine allows a reduction in the temperatures of engine oil. This enables engine oil to have increased viscosity with the resultant capability of suppressing the lubrication defect.

Moreover, in view of the seizing occurring between the cylinder wall surface and the piston, lubricating performance depends on the temperature between the cylinder and the piston. Therefore, temperatures of coolant water of the engine may be preferably used as the corresponding value of engine oil.

With the method of controlling the engine, the step of eliminating the adverse affect on the calculation result of the combustible component quantity comprises executing limiting at least one of an intake air quantity of the engine and a fuel injection quantity, on the basis of at least one of the mixing ratio of the combustible components, the temperature of the engine oil and the corresponding value representing the temperature of the engine oil for thereby suppressing an excess of an output torque of the engine.

As set forth above, as the ratio of the combustible components mixed to engine oil increases, the combustible component quantity of intake air increases with the resultant fear of the engine providing an excess rate of engine torque. Meanwhile, the combustible component quantity of intake air is not uniquely determined on the basis of only the mixing ratio of the combustible components and increases as the temperature of engine oil increases.

With the structure of the present embodiment described above, excessive output torque of the engine can be suppressed on the basis the mixing ratio of the combustible components and at least one of the temperatures of engine oil and the corresponding value. That is, with the engine comprising a diesel engine, the fuel injection quantity is limited. With the engine comprising a gasoline engine, the flow rate of intake air and fuel injection quantity (with the flow rate of intake air employed in a preferred mode) are limited. With such operations, excessive output torque of the engine can be suppressed.

Another aspect of the present invention provides an engine control system for controlling an engine having an intake air system through which air is drawn, a fuel injection valve for performing fuel injection to supply fuel into a combustion chamber, and a crankcase filled with engine oil, the engine control system comprising a sensor for detecting operating parameters of the engine to provide detected values; a calculating section for calculating a combustible component quantity of intake air, resulting from combustible components prevailing in the crankcase, on the basis of a deviation between a commanded injection quantity and a basic injection quantity to provide a calculation result on the commanded fuel injection quantity, a fuel injection affect eliminating section for calculating a ratio of combustible components in engine oil on the basis of one of the detected value related to a temperature of the engine oil for thereby providing a mixing ratio of combustible components in engine oil, and a judging section for making judgment whether or not the mixing ratio of combustible components and the temperature of engine oil belong to an engine performance upgrading zone and providing an output if judgment is made that the mixing ratio of combustible components and the temperature of engine oil belong to the engine performance upgrading zone. An electronic control unit controls the fuel injection valve in response to the output to suppress an increase of the combustible components mixed to the engine oil.

With such a structure, the calculating section calculates the combustible component quantity of intake air, resulting from combustible components prevailing in the crankcase, on the basis of the deviation between the commanded injection quantity and the basic injection quantity to provide the calculation result on the commanded fuel injection quantity. In addition, the fuel injection affect eliminating section calculates the ratio of combustible components in engine oil on the basis of the detected value related to the temperature of the engine oil for thereby providing a mixing ratio of combustible components in engine oil.

Under such a condition, since the judging section makes judgment whether or not the mixing ratio of combustible components and the temperature of engine oil belong to an engine performance upgrading zone and providing an output if judgment is made that the mixing ratio of combustible components and the temperature of engine oil belong to the engine performance upgrading zone. The electronic control unit controls the fuel injection valve in response to the output to suppress an increase of the combustible components mixed to the engine oil. Thus, various measures can be taken to preliminarily avoid the lubrication defect and overrunning of the engine in a simple and effective manner.

DETAILED DESCRIPTION OF PREFERRED EMBODIMENTS

Figure 1:
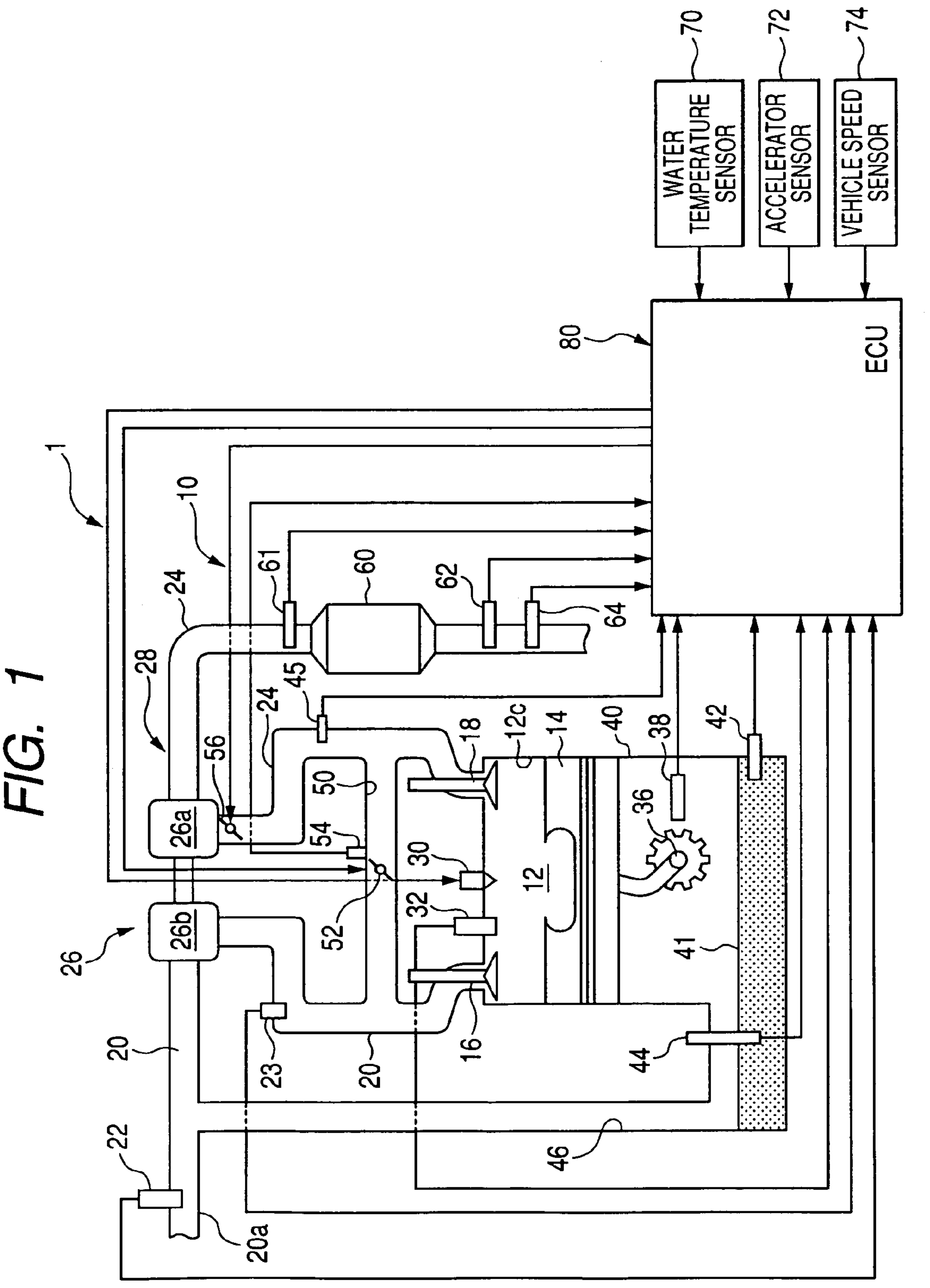
FIG. 1 is a schematic view showing an overall structure of an engine control system of a first embodiment according to the present invention.

Now, engine control systems and control methods of various embodiments according to the present invention are described below in detail with reference to the accompanying drawings. However, the present invention is construed not to be limited to such embodiments described below and technical concepts of the present invention may be implemented in combination with other known technologies or the other technology having functions equivalent to such known technologies.

In the following description, like reference characters designate like or corresponding parts throughout the several views.

First Embodiment

Now, an engine control system of a first embodiment according to the present invention applied to a diesel engine is described below in detail with reference to FIGS. 1 to 6C of the accompanying drawings.

FIG. 1 is a block diagram showing an overall structure of the engine control system common to the first embodiment to a tenth embodiment. Thus, the engine control systems of the first to tenth embodiments are described below with reference to the overall structure of the engine control system shown in FIG. 1.

As shown in FIG. 1, a diesel engine 10 comprises a combustion chamber 12 in which a piston 14 is slidably disposed. The combustion chamber 12 has an intake port 12*a* and an exhaust port 12*b* in which an intake valve 16 and an exhaust valve 18 are operatively disposed, respectively. The intake port 10*a* is connected to an intake air passage 20 acting as an intake air system, supplying intake air to the combustion chamber 12, which has an upstream 20*a* on which an airflow meter 22 is mounted for detecting a flow rate of air passing through the intake air passage 20. The intake air passage 20 is also provided with an intake air pressure sensor 23 in an area upstream of the intake port 12*a* for detecting an intake air pressure (intake vacuum). The exhaust port 12*b* is connected to an exhaust gas pipe 24, acting as an exhaust gas system 28, to emit exhaust gas therethrough. A turbo charger 26, acting as a supercharger, is mounted in the exhaust system 28 and includes a first impeller 26*a*, operatively disposed in the exhaust pipe 24 to be driven with a stream of exhaust gas flowing at a high speed, and a second impeller 26*b* disposed in the intake air passage 24 to force intake air into the combustion chamber 12 via the intake port 12*a*.

The combustion chamber 12 includes a fuel injection valve 30 for cyclically injecting fuel into the combustion chamber 12 at fixed intervals and an in-cylinder pressure sensor 32 for detecting an in-cylinder pressure of the combustion chamber 12.

With intake air compressed by the piston 14, heat develops in the combustion engine and as the fuel injection valve 30 injects fuel into the combustion chamber 12, fuel is ignited due to high heat to cause combustion to take place between fuel and compressed air. This combustion creates energy to cause the piston 14 to be displaced along a cylinder wall surface 12*c* of the combustion chamber 12, thereby generating output torque on an output shaft (crankshaft 36) of the diesel engine 10. A crank angle sensor 38 is mounted on a crankcase 40 and has a distal end placed in an area close proximity to the crankshaft 36 for detecting a rotational angle of the crankshaft 36 as a rotational state of the diesel engine 10.

The crankshaft 36 is coupled to the piston 14 and accommodated inside the crankcase 40 in which engine oil 41 is filled. The crankcase 40 is further provided with an engine oil temperature sensor 42 for detecting temperatures of engine oil 41 and an engine oil quantity sensor 44 for detecting a quantity of engine oil 41 prevailing in the crankcase 40. The crankcase 40 communicates with the intake air passage 20 via a blow-by gas passage 46 through which blow-by gas is drawn from the crankcase 40 to the intake air passage 20 to be mixed to intake air.

The combustion chamber 12 communicates with the exhaust gas passage 24 upon opening movements of the exhaust valve 12*b*. The exhaust gas passage 24 incorporates therein an oxygen sensor 45 for detecting an oxygen concentration of oxygen in exhaust gas passing through the exhaust gas passage 24. The intake air passage 20 and the exhaust gas passage 24 are connected to each other via an exhaust gas recirculation passage 50 (EGR passage 50). The EGR passage 50 incorporates therein an EGR valve 52 that acts as an actuator to adjust a flow passage area of the EGR passage 50 for regulating the flow rate (EGR rate) of exhaust gas to be recirculated to the intake air passage 20 via the EGR passage 50. In addition, an EGR opening sensor 54 is mounted on the EGR passage 50 in an area close proximity to the EGR valve 52 for detecting an opening degree of the EGR valve 52.

Further, the exhaust gas passage 24 has a downstream on which a variable nozzle 56 of the turbo charger 26 is mounted for regulating the flow rate of exhaust gas flowing into the first impeller 26*a* of the turbo charger 26. In addition, the exhaust gas passage 24 also has a further downstream area on which an oxidation catalyst 60 is mounted for performing oxidation catalysis to reduce unburned fuel components remaining in exhaust gas. An upstream exhaust gas temperature sensor 61 is mounted on the exhaust gas passage 24 in an area upstream of the oxidation catalyst 60 for detecting temperatures of exhaust gas at an upstream area of the oxidation catalyst 60. Moreover, a downstream exhaust gas temperature sensor 62 is mounted on the exhaust gas passage 24 in an area downstream of the oxidation catalyst 60 for detecting temperatures of exhaust gas at the downstream area of the oxidation catalyst 60. In addition, an air/fuel ratio sensor 64 is also mounted on the exhaust gas passage 24 in the area downstream of the oxidation catalyst 60 for detecting an air/fuel ratio on the basis of a concentration of oxygen prevailing inside the exhaust gas passage 24.

With the engine control system set forth above, the diesel engine 10 further includes a water temperature sensor 70 for detecting temperatures of coolant water flowing through water jackets (not shown) of an engine block (not shown). In addition, an accelerator sensor 72 is mounted in an area near an accelerator pedal (not shown) to detect a displacement stroke of the accelerator pedal. Moreover, a vehicle speed sensor 74 is provided for detecting a running speed of a vehicle on which the diesel engine 10 is installed to propel the vehicle.

Thus, the various meter and sensors set forth above act as detection units for detecting engine parameters, correlated to the combustible components in the crankcase 40 as will be clarified below in detail, which are input to an engine control unit (ECU) 80.

Figure 2:
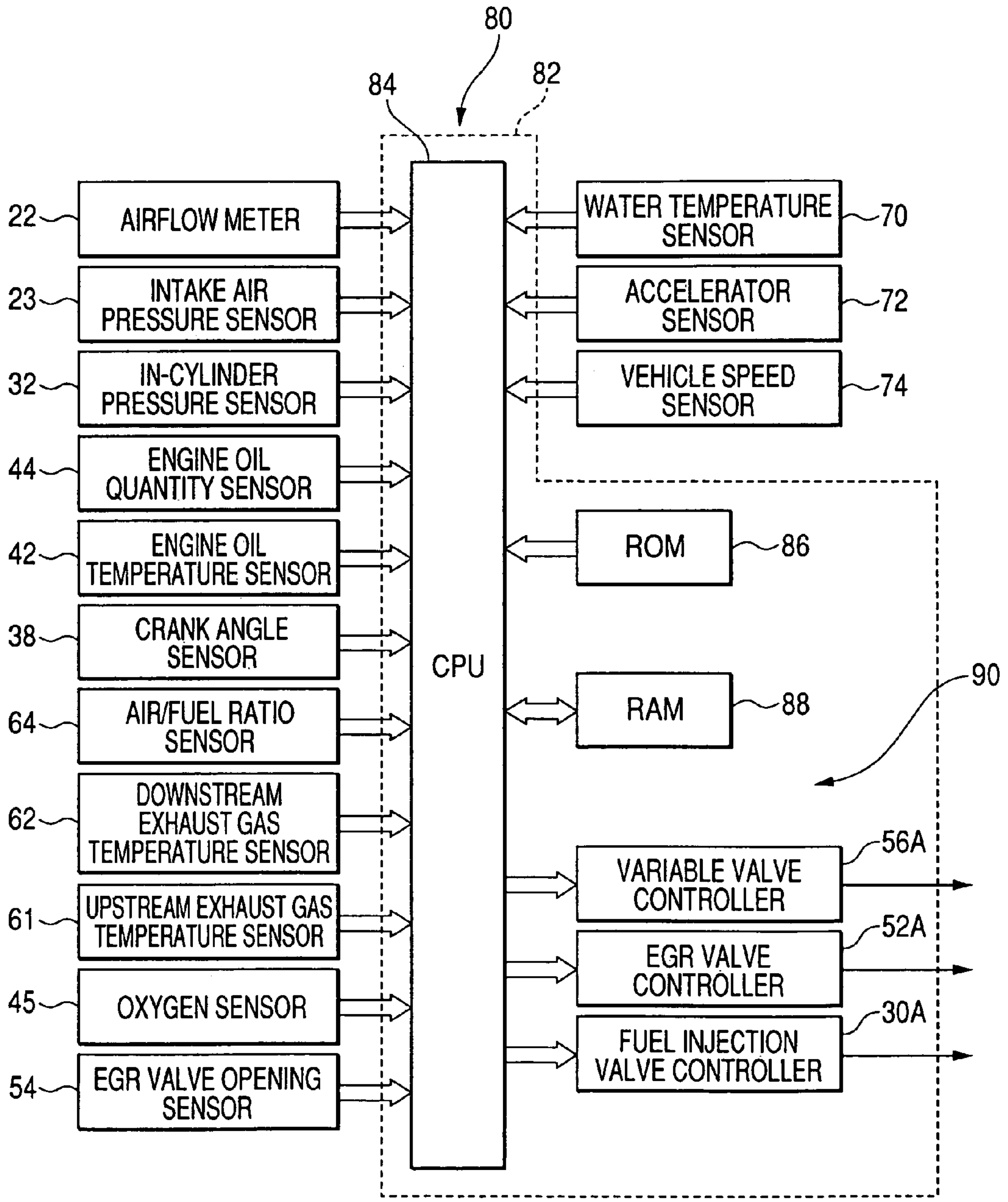
FIG. 2 is a block diagram showing a detailed example of an engine control unit (ECU) incorporated in the engine control system of the first embodiment shown in FIG. 1.

Referring to FIG. 2, there is shown a circuit diagram of the engine control system 1 common to the first embodiment to the tenth embodiment. Thus, the engine control systems of the first to tenth embodiments are described below with reference to the overall structure of the engine control system shown in FIG. 1 and the circuit diagram of FIG. 2.

As shown in FIG. 2, the engine control system 1 comprises the ECU 80 including a microcomputer 82. The microcomputer 82 includes a CPU 84, a ROM (Read On Memory) 86 and a RAM (Random Access Memory) 88. The ROM 86 stores therein engine control programs, various programs needed for performing other operation except for engine controls, and data tables. In addition, the ROM 86 acts as a memory unit that temporarily stores various data resulting from calculations executed in the CPU 84 on the basis of various engine parameters. In general, the ECU 84 is programmed to receive a detection signal on a displacement stroke of the accelerator pedal, detected by the accelerator sensor 72, and another detection signal on a crank angle detected by the crank angle sensor 38 to calculate a demanded injection quantity. With the demanded injection quantity calculated, the CPU 84 performs fuel injection control for commanding the fuel injection valve controller 30A so as to activate the fuel injection valve 30 on the basis of the demanded injection quantity such that the diesel engine 10 provides demanded output torque depending on the displacement stroke of the accelerator pedal. Such fuel injection control is executed for each one combustion cycle (in four strokes) as will be set forth below.

The CPU 84 is connected to the airflow meter 22, the intake air pressure sensor 23, the in-cylinder pressure sensor 32, the crank angle sensor 38, the engine oil temperature sensor 42, the engine oil quantity sensor 44, the oxygen sensor 45, the upstream exhaust gas temperature sensor 61, the downstream exhaust gas temperature sensor 62, the air/fuel ratio sensor 64, the water temperature sensor 70, the accelerator sensor 72 and the vehicle speed sensor 74 to receive various detections signals as engine parameters representing the operating conditions of the engine 10.

The ECU 80 also comprises a fuel injection valve controller 30A, an EGR valve controller 52A and a variable nozzle controller 56A, which are connected to the fuel injection valve 30, the EGR valve 52 and the variable nozzle 56, respectively, and act as an engine performance upgrading device 90 through which various measures are taken against a lubrication defect and overrunning of the engine 10 in a manner as will be described below in detail. Thus, the ECU 80 controls an output of the diesel engine 10 on the basis of the various detection signals applied to the CPU 84 as the engine parameters.

More particularly, the CPU 84 is programmed to receive the accelerator detection signal indicative of the displacement stroke of the accelerator pedal and the crankshaft angle detection signal output from the accelerator sensor 72 and the crank angle sensor 38, respectively, and calculate a demanded fuel injection quantity, needed for the diesel engine 10 to generate demanded output torque, on the basis of the accelerator detection signal and the crankshaft angle detection signal. The ROM 86 preliminarily stores therein main fuel control program associated with the accelerator detection signal and the crankshaft angle detection signal and the CPU 84 commands the fuel injection valve controller 30A according to the demanded fuel injection quantity resulting from calculation so as to actuate the fuel injection valve 30 to perform fuel injection control.

The fuel injection control is executed such that the fuel injection valve 30 injects fuel into the combustion chamber 12 in multiple stages to achieve plural injections of fuel into the combustion chamber 12 for each combustion cycle (in four strokes). In particular, the ROM 86 preliminarily stores therein operating programs, related to a pilot injection mode, a pre-injection mode, a main injection mode, an after-injection mode and a post-injection mode, and control program to select one of or plural ones of these injection modes depending on the engine parameters.

Among these injection modes, the pilot injection mode is implemented by the fuel injection valve controller 30A such that the fuel injection valve 30 is opened to inject fuel in extremely minimal droplets prior to the main injection mode to promote the mixing between fuel and air in the combustion chamber 12 immediately prior to ignition.

The pre-injection mode is implemented by the fuel injection valve controller 30A such that the fuel injection valve 30 is opened to inject a small amount of fuel into the combustion chamber 12 prior to the main injection mode to create a flash point to shorten a delay of ignition timing after the main injection mode is implemented upon preventing rapid combustion for thereby minimizing emission of nitrogen oxides (NOx) to decrease combustion sound and vibration.

During the main injection mode, the CPU 84 commands the fuel injection valve controller 30A so as to cause the fuel injection valve 30 to perform main fuel injection to obtain demanded output torque.

During the after-injection mode, the CPU 84 commands the fuel injection valve controller 30A so as to cause the fuel injection valve 30 to inject a few amount of fuel into the combustion chamber 12 after the main injection mode is terminated to assist re-combustion of remaining unburned fuel in the form of particular matters thereby preventing soot from being exhausted to the atmosphere.

The post-injection mode is carried out by the CPU 84 that commands the fuel injection valve controller 30A so as to actuate the fuel injection valve 30 for injecting fuel not for causing combustion of fuel inside the combustion chamber 12 but for delivery to the exhaust passage 24. Fuel delivered to the exhaust passage 24 is used for combusting the soot accumulated in a diesel particulate filter (DPF) to control temperatures of exhaust gas for thereby recovering an exhaust-gas aftertreatment device such as DPF.

During the after-injection and post-injection modes of the diesel engine 10, the CPU 84 of the ECU 80 commands the fuel injection valve controller 30A to cause the fuel injection valve 30 to inject fuel into the combustion chamber 12 at a remarkably delayed angle with respect to a top dead center of the piston 14 in a compression stroke. Therefore, injected fuel is liable to adhere directly onto a cylinder wall surface 12*c* of the combustion chamber 12. The, the piston 14 scrapes out fuel, adhered onto the cylinder wall surface 12*c*, which in turn is caused to enter the crankcase 40. In addition, even when a failure occurs in a fuel injection system, the amount of injected fuel adhered onto the cylinder wall surface 12*c* increases, resulting in an increase of the amount of fuel flowing into the crankcase 40.

As fuel flows into the crankcase 40, the amount of the combustible components escaped from the crankcase 40 as blow-by gas increases in intake air drawn through the intake air passage 20 to the combustion chamber 12. The presence of increased amount of the combustible components in intake air causes a drop in control accuracy of the ECU 80 in controlling output torque of the diesel engine 10. Further, as fuel enters the crankcase 40, not only engine oil 41 but also the combustible components (fuel) prevail in the crankcase 40. In other words, the combustible components (fuel) are mixed with engine oil 41. With engine oil mixed with the combustible components, engine oil 41 is diluted with a fear of inviting deterioration of lubricating performance and, hence, lubrication defect takes place in the diesel engine 10.

With the present embodiment, therefore, the ECU 80 is configured to allow the CPU 84 to receive various detection signals, representing engine-operating states acting as engine parameters from various sensors mentioned above. The ROM 86 of the CPU 84 preliminarily stores therein a control map related to a combustible component quantity of intake air, resulting from combustible components contained in blow-by gas delivered from the crankcase 40, and the various detection signals set forth above. Thus, the CPU 84 plays a role as a calculating section to calculate the combustible component quantity of intake air reflecting the combustible components contained in blow-by gas drawn from the crankcase 40.

Here, the term "combustible component quantity of intake air" means a combustible component quantity of intake air drawn through the intake air passage 20 to the combustion chamber 12.

Further, the tem "the combustible components in intake air reflecting the combustible components in the crankcase 40" refers not only to the combustible components in blow-by gas escaping from the crankcase 40 but also to flammable components evaporated from engine oil 41 in the crankcase 40 because engine oil 41 is used as lubricating oil.

The CPU 84 then calculates a degree of fuel mixed to engine oil 41 on the basis of the combustible component quantity. With the operation of the CPU 84 calculating a ratio of fuel mixed to engine oil 41, the CPU 84 of the ECU 80 commands the engine performance upgrading device to perform various processing to suppress a drop in control accuracy of output torque of the diesel engine 10 and a drop in lubricating performance of engine oil 41.

Figure 3:
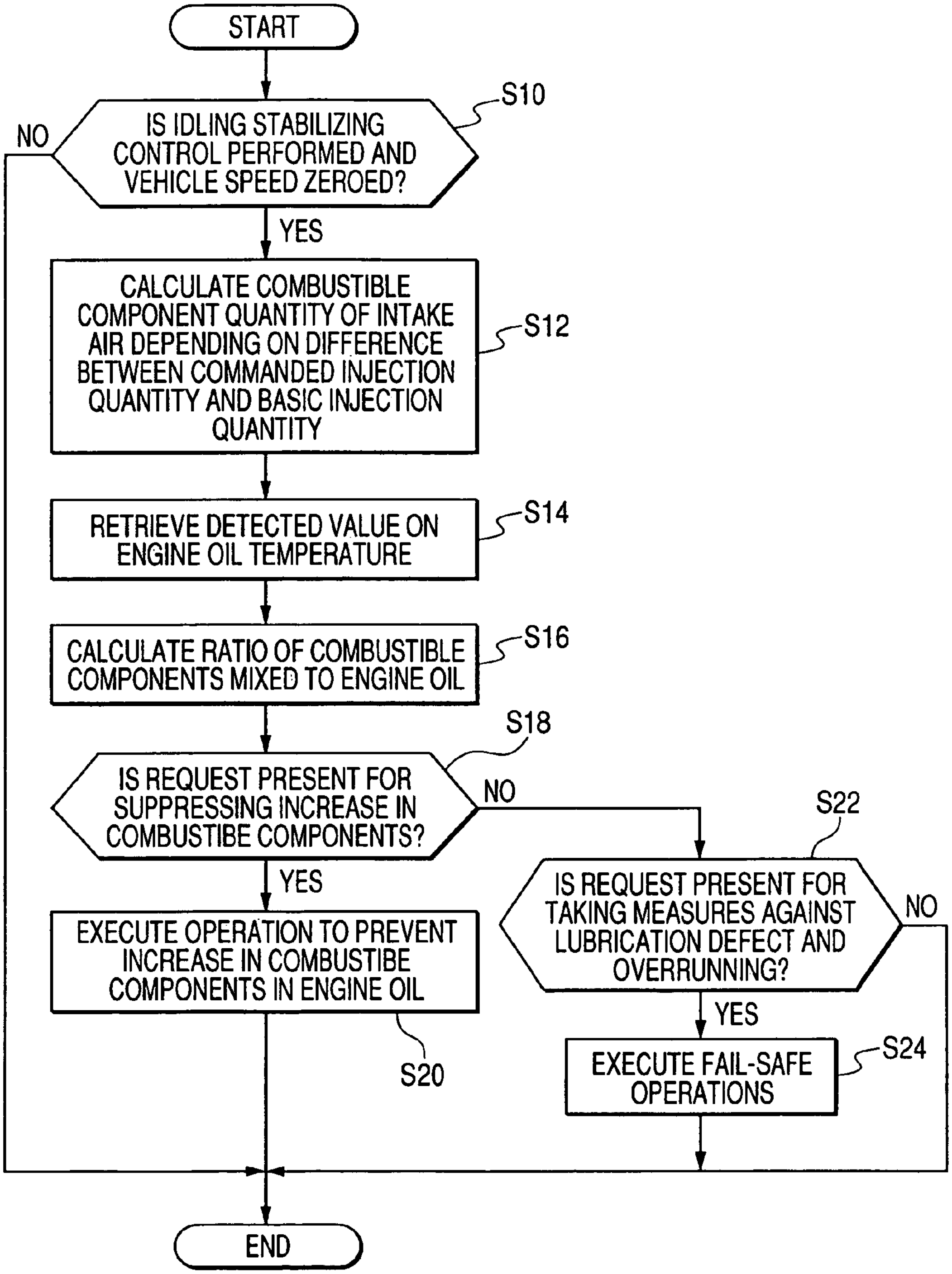
FIG. 3 is a flow chart showing a basis sequence of operations to be executed by the engine control unit of the engine control system shown in FIG. 1.

FIG. 3 is a basic sequence of operations to be executed by the CPU 84 for calculating a combustible component quantity of intake air, reflecting the combustible components contained in blow-by gas delivered from the crankcase 40, on the basis of various detection signals on a rotational state of the diesel engine 10 detected by the crank angle sensor 38, an oxygen concentration of oxygen in exhaust gas detected by the oxygen sensor 45, temperatures of exhaust gas detected by the exhaust gas temperature sensors 61, 62, an in-cylinder pressure of the combustion chamber 12 detected by the in-cylinder pressure sensor 32 and a vehicle speed detected by the vehicle speed sensor 74. Such operation is repeatedly implemented at given cycles.

During such a basic sequence of operations, first in step S10, the CPU 84 makes judgment to determine whether or not idling stabilizing control is performed and a vehicle speed, detected by the vehicle speed sensor 74, is zeroed. If the CPU 84 makes judgment in step S10 that the above conditions are satisfied, then, the operation proceeds to step S12.

In next step S12, the CPU 84 calculates the combustible component quantity of intake air on the basis of a deviation between a commanded value (commanded fuel injection quantity), required for the fuel injection valve 30 to inject fuel into the combustion chamber 12 at an injection rate for achieving idling stabilizing control, and a basic injection quantity. Thus, with the CPU 84 executing the operation in step S12, the CPU 84 plays a role as a calculating section to calculate the combustible component quantity of intake air depending on the various parameters of the engine.

Here, the term "basic injection quantity" refers to a theorized injection quantity needed for a rotational speed of the crankshaft 36 to be feedback controlled to a target speed under circumstances where torque, applied to the crankshaft 36 from drive wheels, is zeroed and the combustible component quantity of intake air, reflecting the combustible components in the crankcase 40, is zeroed. That is, output torque of the crankshaft 36 is generated when combustion of fuel takes place in the combustion chamber 12 and, thus, such output torque has a correlation with the injection quantity. Accordingly, it becomes possible to determine the theorized injection quantity required for the rotational speed of the crankshaft 36 to be maintained at the target speed under preset conditions.

Meanwhile, the term "commanded fuel injection quantity" refers to an injection quantity actually required for the rotational speed of the crankshaft 36 to be feedback controlled to the target speed. It is conceived that the deviation between the basic injection quantity and the commanded fuel injection quantity occurs due to the combustible components contained in intake air drawn through the intake air passage 20 to the combustion chamber 12.

Figure 4:
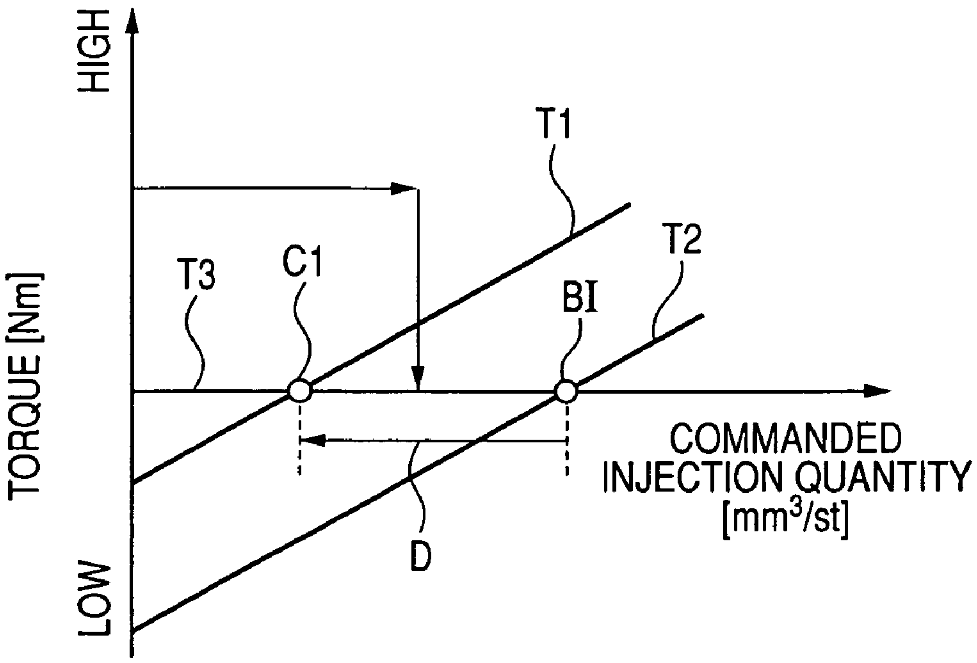
FIG. 4 is a graph showing the relationship between a commanded injection quantity and a combustible component quantity of intake air during an idling stabilizing control mode.

FIG. 4 shows the relationship between the commanded fuel injection quantity [$mm^3$/st] and output torque of the crankshaft 36. In FIG. 4, a curve T1 shows variation in output torque [Nm] of the diesel engine 10 under a status where the combustible components, contained in blow-by gas delivered from the crankcase 40, are mixed to intake air drawn through the intake air passage 20 to the combustion chamber 12. A curve T2 shows variation in output torque of the diesel engine 10 under another status where no combustible components are mixed to intake air drawn to the combustion chamber 12. A straight line T3 represents a demanded torque on an idling of the diesel engine 10. In addition, BI represents a theorized basic injection quantity required for maintaining the crankshaft 36 at a target idling speed and CI represents a commanded fuel injection quantity actually required for maintaining the crankshaft 36 at the target idling speed. D represents a deviation between the basic injection quantity BI and the commanded fuel injection quantity CI.

As shown in FIG. 4, as the commanded injection quantities increase under both of the statuses mentioned above, output torque of the crankshaft 36 also increases. However, even with the demanded output torques remaining at the same value, the commanded fuel injection quantity decreases when intake air contains the combustible components delivered with blow-by gas drawn from the crankcase 40.

For the above reason, a combustible component quantity of intake air, reflecting the combustible components contained in blow-by gas delivered from the crankcase 40, can be calculated on the basis of the deviation D between the commanded fuel injection quantity CI and the basic injection quantity BI appearing during idling stabilizing control as will be appreciated from FIG. 4. That is, the combustible component quantity (amount of fuel) contained in intake air can be calculated upon removing the fuel injection quantity from a total amount of combustible components contained in intake air.

In other words, in calculating the combustible component quantity on the ground that the rotational speed of the crankshaft 36 remains at a target rotational speed, the basic injection quantity can be removed as an affecting quantity, caused by fuel injection, which reflects on calculating the combustible component quantity mentioned above. To achieve such an end, the ROM 86 preliminarily stores therein a control map related to the deviation between the commanded fuel injection quantity and basic injection quantity in respect of output torque of the diesel engine 10 as shown in FIG. 4.

In such a way, as the CPU 84 calculates the combustible component quantity of intake air reflecting the combustible components contained in blow-by gas drawn from the crankcase 40, the CPU 84 executes the operation in step S14, shown in FIG. 3, to retrieve a detected value from the engine oil temperature sensor 42 on the operating temperatures of engine oil 41. In consecutive step S16, the CPU 84 calculates a ratio of the combustible components mixed to engine oil 41 on the basis of the combustible component quantity, calculated in step S12, and the detected value retrieved in step S14.

In such a way, with the CPU 84 executing the operations in steps S12 to S16 shown in FIG. 3, the CPU 84 plays a role as a fuel injection affect eliminating section that prevents fuel, injected to the combustion chamber 12 and caused to flow into the crankcase 40 to be circulated to the intake air passage 20, from adversely affecting a calculation result on the combustible component quantity of intake air.

In general, as the combustible components are mixed to engine oil 41, the combustible components evaporate during operations of the diesel engine 10, causing the amount of combustible components in intake air to increase due to the combustible components in the crankcase 40. Thus, an attention is focused on the correlation between the ratio of the combustible components mixed to engine oil 41 and the combustible component quantity of intake air. However, the combustible component quantity of intake air cannot be uniformly determined depending on the mixing ratio of the combustible components in engine oil 41 and varies according to the temperatures of engine oil 41. This is due to the fact that the higher the temperatures of engine oil 41, the greater will be the rate of evaporation of the combustible components mixed to engine oil 41 and this results in an increase in the amount of combustible components to be mixed to intake air.

With the above view in mind, the ROM 86 preliminarily stores therein a control map related to such correlation between the mixing ratio of the combustible components in engine oil 41 and the combustible component quantity of intake air, thereby permitting the CPU 84 to refer to such control map to execute the calculating operation mentioned above.

Figure 5:
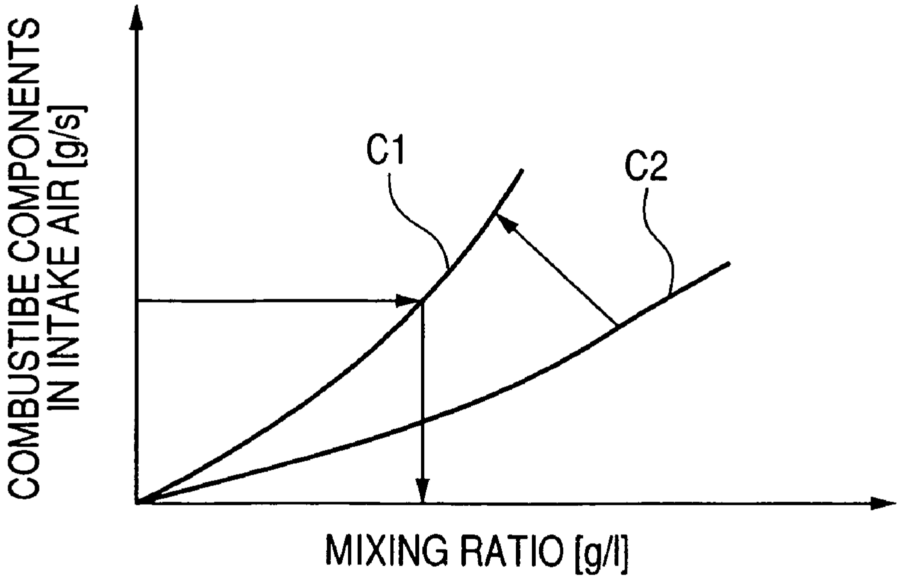
FIG. 5 is a graph showing the relationship between a ratio of combustible components mixed to engine oil and a combustible component quantity of intake air.

FIG. 5 shows the relationship between the mixing ratio [g/l] of the combustible components in engine oil 41 and a combustible component quantity [g/s] of intake air in terms of the temperatures of engine oil 41. In FIG. 5, a curve C1 represents variation of the combustible components involved in intake air with engine oil 41 laying at a high temperature and a curve C2 represents variation of the combustible components involved in intake air with engine oil 41 laying at a low temperature.

Turning back to FIG. 3, as the mixing ratio of the combustible components of engine oil 41 is calculated in step S16 by the CPU 84, the CPU 84 executes the operations in steps S18 to S24 upon reflecting the combustible component quantity and the mixing ratio calculated in preceding steps S12, S16, respectively, to perform fuel injection affect eliminating operations. Such fuel injection affect eliminating operations are described below in detail.

Figure 6A:
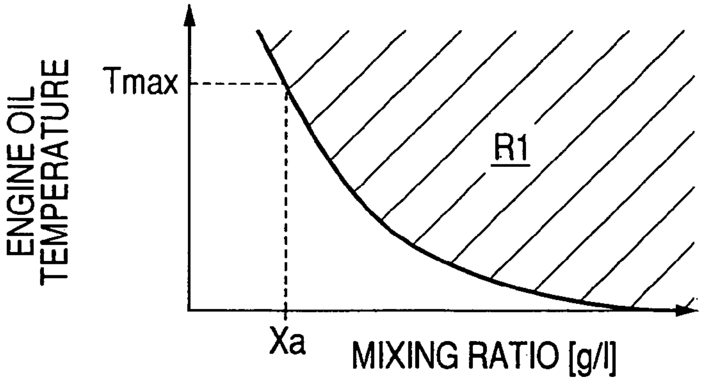
FIG. 6A is a graph showing the relationship between a mixing ratio of combustible components and a temperature of engine oil for illustrating a first area that needs first measure to be taken against a lubrication defect.

FIG. 6A is a graph showing the relationship between the temperatures of engine oil 41 and the mixing ratio of the combustible components in engine oil 41. That is, FIG. 6A shows a region R1, indicated in a hatched area, which needs to take measure against a lubrication defect of engine oil 41 as one of the fuel injection affect eliminating operations. Such a region R1 is determined on the basis of the temperatures of engine oil 41 and the mixing ratio of the combustible components in engine oil 41.

As shown in FIG. 6A, the region R1 varies such that the greater the mixing ratio of the combustible components in engine oil 41, the lower will be the temperature of engine oil 41 needed to take measure against the lubrication defect. This is due to the fact that as the mixing ratio of the combustible components in engine oil 41 increases, a viscosity of engine oil 41 decreases with the resultant drop in lubricating performance.

Further, as shown in FIG. 6A, the relationship between the mixing ratio of the combustible components in engine oil 41 and the temperatures of engine oil 41 varies such that the higher the mixing ratio of the combustible components in engine oil 41, the lower will be the temperature of engine oil 41 for the region R1 needed to take measure against the lubrication defect. This is because of the fact that the higher the mixing ratio of the combustible components in engine oil 41, the lower will be the viscosity of engine oil 41 with the resultant drop in lubrication defect. In addition, such a relation varies such that the higher the temperature of engine oil 41, the lower will be the mixing ratio of the combustible components in engine oil 41 for the region R1 needed to take measure against the lubrication defect. This is because of the fact that the higher the temperature of engine oil 41, the lower will be the viscosity of engine oil 41 with the resultant drop in lubrication defect.

Further, FIG. 6A shows the relationship between the maximum value Tmax, theorized to be the temperature of engine oil 41, and the minimum mixture ratio Xa that lies at a minimal value of the mixing ratio for the region R1 needed to take measure against the lubrication defect.

Figure 6B:
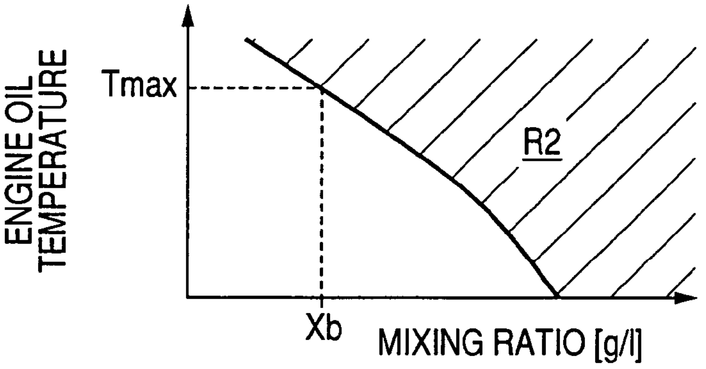
FIG. 6B is a graph showing the relationship between the mixing ratio of combustible components and the temperature of engine oil for illustrating a second area that needs second measure to be taken against an overrunning of an engine.

FIG. 6B is a graph showing the relationship between the temperatures of engine oil 41 and the mixing ratio of the combustible components in engine oil 41. In FIG. 6B, R2 represents a region, needed for measure to be taken against overrunning of the diesel engine 10, which is determined on the basis of the mixing ratio of the combustible components in engine oil 41 and the temperatures of engine oil 41. Measure against overrunning of the diesel engine 10 is executed as another one of fuel injection affect eliminating operations.

As shown in FIG. 6B, the region R2 varies such that the higher the mixing ratio of the combustible components in engine oil 41, the lower will be the temperature of engine oil 41 for measure to be taken against the lubrication defect. This is because of the fact that the higher the mixing ratio of the combustible components in engine oil 41, the greater will be the amount of combustible components in intake air reflecting the combustible components in the crankcase 40. In addition, such a region R2 varies such that the higher the temperature of engine oil 41, the lower will be the mixing ratio of the combustible components in engine oil 41 for measure o be taken against overrunning of the diesel engine 10. This is because of the fact that the higher the temperature of engine oil 41, the greater will be the rate of combustible components evaporated from engine oil 41.

Further, FIG. 6B shows the relationship between the maximum value Tmax, theorized to be the temperature of engine oil 41, and the minimum mixture ratio Xb that lies at a minimal value of the mixing ratio for the region R2 needed to take measure against overrunning of the diesel engine 10.

Figure 6C:
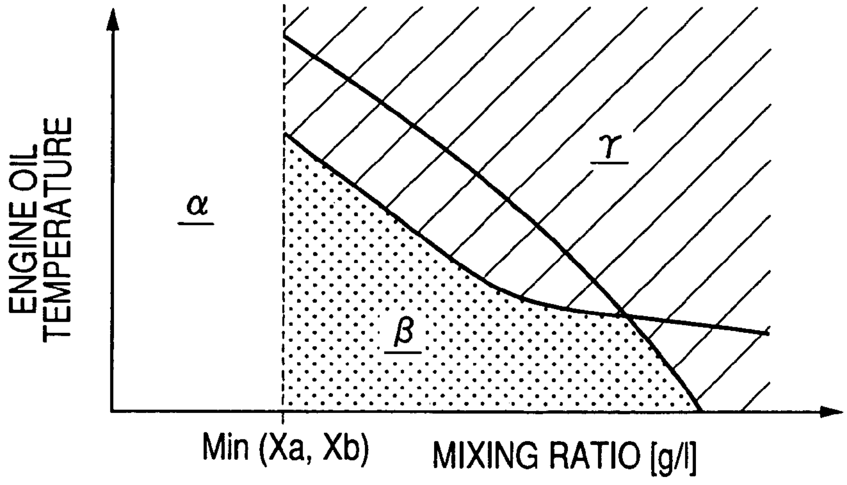
FIG. 6C is a graph showing the relationship between the mixing ratio of combustible components and the temperature of engine oil for illustrating first to second engine performance upgrading zones of which second and second engine performance upgrading zones need to take measures for upgrading engine performance.

FIG. 6C is a graph showing the relationship between the temperatures of engine oil 41 and the mixing ratio of the combustible components in engine oil 41 in respect of various operations needed for various measures to be taken for fuel injection affect eliminating operations.

In FIG. 6C, a normal operating zone α indicates an area that takes an upper limit selected to be smaller one of the mixing ratio Xa, shown in FIG. 6A, and the mixing ratio Xb shown in FIG. 6B. A first engine performance upgrading zone γ indicates an area for at least one of measures to be taken against the lubrication defect and overrunning of the diesel engine 10 set forth above. Here, the first engine performance upgrading zone γ is defined as a region resulting from removing the region α from a sum of sets including the region for measure to be taken against the lubrication defect, shown in FIG. 6A, and the region for measure to be taken against the overrunning shown in FIG. 6B. In addition, a second engine performance upgrading zone β indicates a region except for the regions α and γ.

Even though no need arises in the second engine performance upgrading zone β to take measures against the lubrication defect and overrunning of the diesel engine 10, the second engine performance upgrading zone β is a critical area because the diesel engine 10 operates with a fear of risks of a shift from the normal operating zone to the first engine performance upgrading zone γ. To avoid such risks, the ROM 86 of the CPU 84 preliminarily stores therein a control map related to data shown in FIG. 6C for executing at least one of various operations. These operations include: increasing the amount of fresh air to be drawn through the intake air passage 20 into the combustion chamber 12; increasing the temperature of engine oil 41; limiting a fuel injection quantity in post-injection; and advancing injection timing in post-injection at low engine load for the purpose of suppressing the combustible components being mixed to engine oil 41.

Increasing the amount of fresh air in a stream of intake air passing through the intake air passage 20 enables an increase in the amount of the combustible components evaporating from engine oil 41. This also leads to a reduction of the ratio of combustible components mixed to engine oil 41. To this end, the ROM 86 of the CPU 84 preliminarily stores therein control program to allow the CPU 84 to command the EGR valve controller 52A so as to decrease the opening degree of the EGR valve 52. With the opening degree of the EGR valve 52 in reduction, the flow of exhaust gas recirculated to the intake air passage 20 decreases and a rate of fresh air passing through the intake air passage 20 increases. With such operation, fresh air passes through the intake air passage 20 to the combustion chamber 12 at an increased flow rate. In addition, performing control so as to increase the rotational speed of the crankshaft 36 enables an increase of the flow rate of fresh air per unit time.

Further, by raising the temperature of engine oil 41, the combustible components evaporate from engine oil 41 at an increased rate. This leads a reduction in the ratio of the combustible components mixed to engine oil 41. To this end, the ROM 86 of the CPU 84 preliminarily stores data related to various fuel injection patterns allocated to the fuel injection valve 30 for respective operating parameters of the diesel engine 10. The CPU 84 commands the fuel injection valve controller 30A so as to alter the fuel injection pattern for the fuel injection valve 30 to be actuated. That is, upon injecting fuel into the combustion chamber 12, combustion of fuel takes place the combustion chamber 12 contributing to various effects such as generation of output torque on the crankshaft 36 and generation of heat in varying contribution rates that differ according to fuel injection patterns. Therefore, altering the fuel injection pattern results in an increase of the temperature of coolant water in the water jacket of the diesel engine 10 to cause the temperature of engine oil 41 to increase. In an alternative, the diesel engine 10 may take a modified structure having an electronic control type thermostat adapted to regulate a recirculation rate of coolant water by which the temperature of coolant water is raised. Thus, such a structure can raise the temperature of engine oil 41. In another alternative, the diesel engine 10 may further include a heater mounted on the crankcase 40 to controllably raise the temperature of engine oil 41.

Furthermore, limiting an injection quantity in post-injection enables a reduction in the rate of fuel adhered to the cylinder wall surface 12*c* of the combustion chamber 12. This results allows engine oil 41 to have a lower ratio of combustible components mixed to engine oil 41 than that of the combustible components mixed to engine oil 41 with no limitation of injection quantity in post-injection. Especially during operation of the diesel engine 10 under low load, exhaust gas passing through the exhaust gas passage 24 lies at a low temperature and, hence, an increased injection quantity is required in performing post-injection. Therefore, fuel is caused to adhere onto the cylinder wall surface 12*c* of the combustion chamber 12 at a remarkably increased during post-injection under low engine load. This tends to cause the combustible components to be mixed to engine oil 41 at a remarkably increased rate. Therefore, the post-injection quantity may be preferably minimized and, more preferably, the post-injection may be inhibited. That is, the CPU 84 commands the fuel injection controller 30A to render the fuel injection valve 30 inoperative to shut off fuel injection under low engine load.

Meanwhile, for the first engine performance upgrading zone γ, the ECU 80 controls the diesel engine 10 in a way to limit the rotational speed and output torque of the diesel engine 10 or limit post-injection as fuel injection affect eliminating operations. Here, output torque of the diesel engine 10 is limited for the purpose of taking measures both against lubrication defect and overrunning of the diesel engine 10.

That is, limiting output torque of the diesel engine 10 lowers the temperature of engine oil 41. This results in a capability of increasing a viscosity of engine oil 41 with the resultant minimization of lubrication defect. Further, when limiting output torque of the diesel engine 10 for the purpose of taking measure against the overrunning of the diesel engine 10, the demanded injection quantity for generating output torque depending on a displacement stroke of the accelerator pedal has an upper limit guard value that is set to a value enabling the suppression of overrunning caused by an increase of the combustible components contained in blow-by gas.

In addition, the rotational speed of the diesel engine 10 is limited with a view to taking measure against the lubrication defect. The rotational speed of the diesel engine 10 is set to have an upper limit guard value available for avoiding piston seizing caused by the lubrication defect occurring between the cylinder wall surface 12*c* and the piston 14. Moreover, the post-injection is limited for avoiding a further increase of the ratio of the combustible components mixed to engine oil 41.

Further, for the normal operating zone α in the relationship between the temperature of engine oil 41 and the mixing ratio of combustible components shown in FIG. 6C, no need arises for measures to be taken against the lubrication defect and overrunning of the diesel engine 10. The ECU 80 commands the fuel injection valve controller 30A, the EGR valve controller 52A and the variable nozzle controller 56A in normal modes for performing normal output control of the diesel engine 10.

For executing various controls associated with the first to second engine performance upgrading zones shown in FIG. 6C, the ROM 86 of the CPU 84 preliminarily stores therein a control map shown in FIG. 6C. Thus, in step S18 in FIG. 3, the CPU 84 makes judgment to determine whether or not there is a request for suppressing an increasing in combustible components in engine oil.

If judgment is made in step S18 that there is a request for suppressing an increase in combustible components in engine oil, then, the CPU 84 executes execute operation to prevent an increase in a quantity of combustible components in engine oil. These include a step of increasing the amount of fresh air drawn through the intake air passage 20 into the combustion chamber 12 upon lowering the opening degree of the EGR valve 52, a step of increasing the temperature of engine oil 41, a step of limiting a fuel injection quantity in post-injection and a step of advancing injection timing of the fuel injection valve 30 in post-injection under low engine load.

In such a way, with the CPU 84 executing step S18 shown in FIG. 3, the CPU 84 plays a role as a judging section to judge whether or not the mixing ratio of the combustible components in engine oil 41 and the temperature of engine oil 41 belong to the first engine performance upgrading zone β that needs various measures, mentioned above, to be taken for preventing further increase of combustible components to be mixed to the engine oil 41.

In next step S22, the CPU 84 discriminates whether or not the mixing ratio of the combustible components in engine oil 41 and the temperature of engine oil 41 belong to the second engine performance upgrading zone γ. If judgment is made in step S22 that none of these statuses belong to the first engine performance upgrading zone γ, then, the CPU 84 executes various operations in step S24 as fail-safe processing in the manner as set forth above.

That is, for the first engine performance upgrading zone γ, the ECU 80 controls the diesel engine 10 in a way to limit the rotational speed and output torque of the diesel engine 10 or limit post-injection as fuel injection affect eliminating operations. Here, output torque of the diesel engine 10 is limited for the purpose of taking measures both against lubrication defect and overrunning of the diesel engine 10.

More particularly, by limiting output torque of the diesel engine 10, the temperature of engine oil 41 is lowered. This results in a capability of increasing a viscosity of engine oil 41 with the resultant minimization of lubrication defect. Further, upon limiting output torque of the diesel engine 10, overrunning of the diesel engine 10 can be avoided in a manner as set forth above.

In addition, under circumstances where negative judgments are made in steps S10 and S22 or when the operations in steps S20, 24 are completed, the operations specified above are completed once.

With the present embodiment set forth above in detail, the engine control system 1 has various advantageous effects as listed below.

(1) The ECU 80 includes the microcomputer 82 having the CPU 84 programmed to calculate the combustible component quantity of intake air, reflecting the combustible components in the crankcase 40, on the basis of the deviation between the basic injection quantity, theorized in executing idling stabilization control, and the actually commanded fuel injection quantity. Thus, utilizing the deviation between the theorized basic injection quantity and the actually commanded fuel injection quantity enables the calculation of the combustible component quantity reflecting the combustible components in the crankcase 40 while accomplishing the fuel injection adverse affect eliminating operations to address the mixing of the combustible components to intake air drawn to the combustion chamber 12.

(2) The ratio of the combustible components mixed to engine oil 41 can be properly calculated on the basis of the combustible component quantity of intake air, reflecting the combustible components in the crankcase 40, and the detected value on the temperature of engine oil 41.

(3) When the mixing ratio of the combustible components in engine oil 41 and the temperature of engine oil 41 belong to the first engine performance upgrading zone β, the CPU 84 of the ECU 80 executes the fuel injection affect eliminating operations to achieve at least one of increasing fresh air by lowering the opening degree of the EGR valve 52, increasing the temperature of engine oil 41, limiting the injection quantity in post-injection and advancing injection timing in post-injection. By so doing, the ECU 80 performs managements of the various component parts for minimizing the combustible components mixed to engine oil 41 before the diesel engine 10 enters a critical operating range that needs measures against the lubrication defect and overrunning of the diesel engine 10.

(4) When the ratio of the combustible components mixed to engine oil 41 and the temperature of engine oil 41 belong to the first engine performance upgrading zone γ, the CPU 84 of the ECU 80 executes the fuel injection affect eliminating operations including a step of limiting output torque and rotational speed of the diesel engine 10 and a step of limiting post-injection. Such operations result in a capability for measures to be appropriately taken against the lubrication defect and overrunning of the diesel engine 10.

(5) Applying a concept of the present invention to an engine such as the diesel engine 10 enables adverse affect reflecting evaporative fuel to be favorably eliminated when calculating the combustible component quantity of intake air resulting from the combustible components in the crankcase 40.

Second Embodiment

An engine control system of a second embodiment according to the present invention is described below in detail with reference to FIGS. 1, 2 and 7. The engine control system of the second embodiment differ from that of the first embodiment in that the CPU 84 is programmed to calculate a combustible component quantity of intake air in further increased accuracy on the basis of a learning value in a manner described below in detail.

With the first embodiment, the CPU 84 has been programmed to execute the operations for calculating the combustible component quantity of intake air, reflecting the combustible components contained in engine oil 41 inside the crankcase 40, on the basis of the deviation between the basic injection quantity and the actually commanded fuel injection quantity during the operation in idling stabilizing control.

However, a univocal determination of the combustible component quantity of intake air on the basis of the deviation between the basic injection quantity and the commanded fuel injection quantity is premised on the ground that at least the commanded fuel injection quantity, for the fuel injection valve 30, matches the actual injection quantity. Therefore, if piece-to-piece variations take place in fuel injection valve in terms of injection characteristics thereof due to individual differences, such variations of the injection characteristics adversely affects the deviation between the basic injection quantity and the commanded fuel injection quantity.

Therefore, the basic flow of operations, shown in FIG. 3, may be preferably executed to perform idling stabilizing operation using a learning value for compensating variation in the injection characteristics of the fuel injection valve. However, in learning the learning value, the learning value to be learned takes a value depending on the combustible component quantity under a circumstance where intake air passing through the intake air passage 20 contains the combustible components resulting from the combustible components prevailing in the crankcase 40. Accordingly, the leaning value, learned when the intake air contains the combustible components reflecting the combustible components in the crankcase 40, has no effect of compensating only the variation in the injection characteristics.

Therefore, with the engine control system of the present embodiment, the CPU 84 of the ECU 80 is programmed to execute the operations to learn a learning value during a period from time at which engine oil 41 is replaced to another time at which post-injection is initiated on a first operating cycle and continuously use this learning value until a subsequent replacement of engine oil 41.

Figure 7:
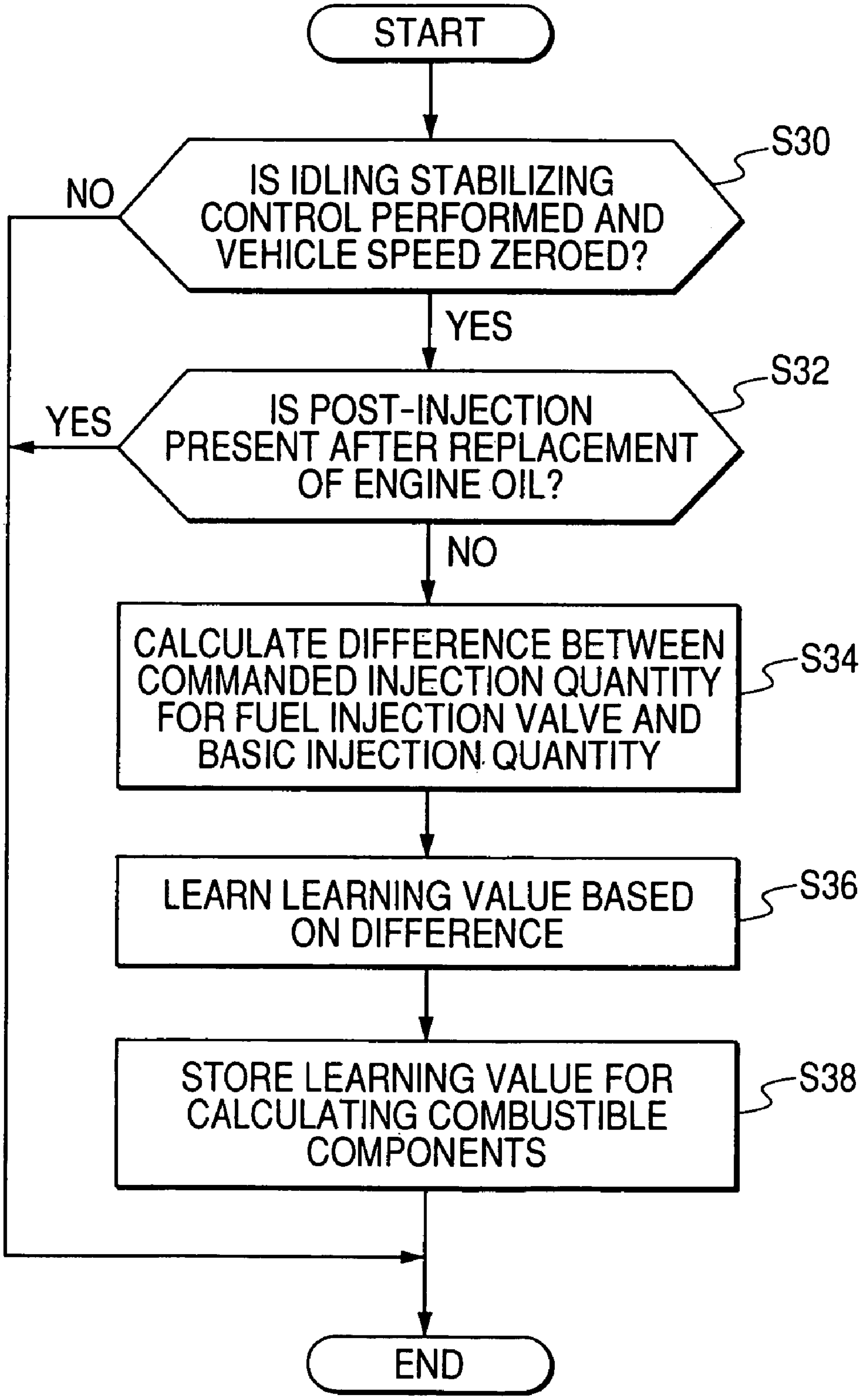
FIG. 7 is a flow chart showing a basis sequence of operations to be executed by an engine control unit of a second embodiment according to the present invention for illustrating how a learning value is learned for the purpose of calculating a combustible component quantity of intake air.

FIG. 7 shows a basic sequence of operations programmed for the CPU 84 to execute learning operations to learn the learning value. Such learning operations are repeatedly implemented for each given cycle.

During such a basic sequence of operations, first in step S30, the CPU 84 makes judgment to determine whether or not idling stabilizing control is performed and a vehicle speed, detected by the vehicle speed sensor 74, is zeroed.

With positive judgment executed in step S30 that the above conditions are satisfied, then, the operation proceeds to step S32.

In step S32, the CPU 84 makes judgment whether or not the post-injection is initiated after engine oil 41 has been replaced. This judgment is made for discriminating whether or not the diesel engine 10 remains under a status immediately after engine oil 41 has been replaced and the combustible components still remains in engine oil 41. If judgment is made in step S32 that the diesel engine 10 remains in the above statuses, then, the operation goes to step S34 wherein the CPU 84 executes the operation to calculate a deviation between the basic injection quantity and the commanded fuel injection quantity for the fuel injection valve 30.

In next step S36, the CPU 84 executes the operation to learn the learning value, resulting from the variation in the injection characteristics of the fuel injection valve, on the basis of the deviation between the basic injection quantity and the commanded fuel injection quantity for the fuel injection valve 30. Here, the basic injection quantity is preset to a theorized quantity needed for performing idling stabilizing control under circumstances where the combustible component quantity of intake air, reflecting the combustible components in the crankcase 40, is zeroed and the fuel injection valve 30 has a reference injection characteristic. Such a reference characteristic may be preferably selected to have a so-called central characteristic in which the variation in the injection characteristics of the fuel injection valve manufactured on a mass production basis are averaged. If a deviation exists between the basic injection quantity, determined in such a way, and the commanded fuel injection quantity, such a deviation is deemed to arise from a fact in that the fuel injection characteristic of the fuel injection valve 30 is deviated from the reference characteristic. Thus, the CPU 84 can learn the learning value on the basis of such a deviation.

With the operation in step S36 completed in such a way, the CPU 84 stores the learning value in the RAM 88 (see FIG. 2) as a learning value for use in executing the basic sequence of operations shown in FIG. 3. The RAM 84 may include a constant memory-holding unit. The constant memory-holding unit may include a memory unit of a type that holds data regardless of a main power supply (not shown) of the ECU 80 is turned on or turned off. Such a memory unit includes a memory (backup RAM or the like), holding data regardless of the presence of or absence of electric power supplied to the microcomputer 82 of the ECU 80, and a non-volatile memory (EEPROM or the like) that can holds data regardless of the presence of or absence of electric power being supplied.

In addition, if negative judgment is made in step S30, if positive judgment is made in step S32 and, further, if the operation in step S38 is completed, the basic sequence of operations in FIG. 7 is terminated once.

The engine control system of the second embodiment has a further advantageous effect (6) in addition to the advantageous effects (1) to (5) of the first embodiment.

(6) That is, the CPU 84 is programmed to obtain the learning value learned during the period from time, at which engine oil 41 is replaced in the crankcase 40 of the diesel engine 10, to time at which the post-injection is initiated. The CPU 84 is also programmed to continuously use the learning value for a period until replaced engine oil 41 is under usage. This allows the CPU 84 to more accurately calculate the combustible component quantity of intake air reflecting the combustible components in the crankcase 40.

Third Embodiment

An engine control system of a third embodiment according to the present invention is described below in detail with reference to FIGS. 1, 2, 8 and 9. With the third embodiment, the engine control system takes the form of the same structure as that of the first embodiment except for several features and the present embodiment is described below with reference to the diesel engine 10 shown in FIGS. 1 and 2 with a focus on such several features.

Figure 8:
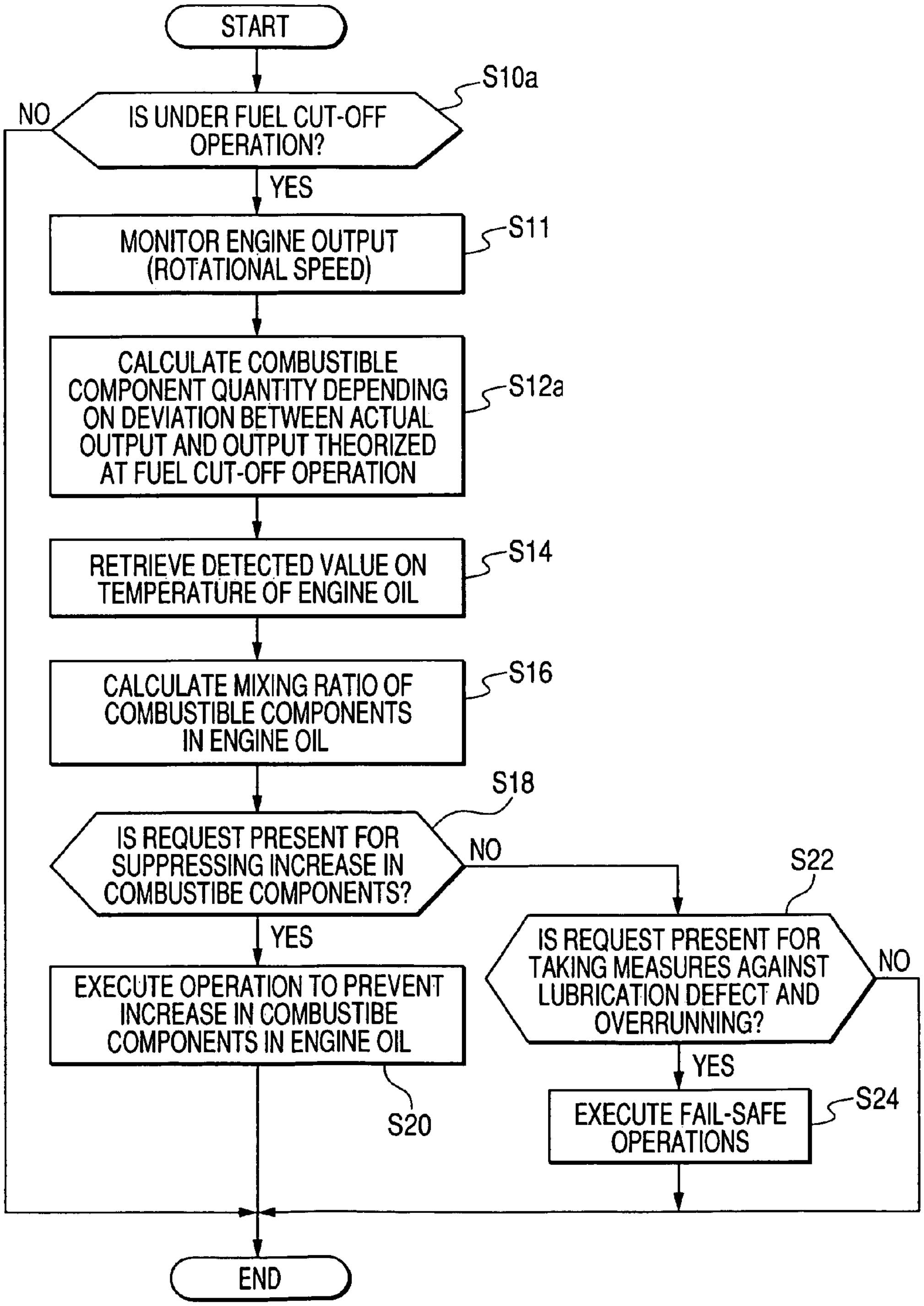
FIG. 8 is a flow chart showing a basis sequence of operations to be executed by an engine control unit of a third embodiment according to the present invention for illustrating how a ratio of combustible components mixed to engine oil is calculated on the basis of a detected value on a temperature of engine oil.

With the engine control system of the third embodiment, the CPU 84 is programmed to execute a basic sequence of operations, shown in FIG. 8, for calculating a combustible component quantity of intake air reflecting the combustible components prevailing in the crankcase 40. That is, the CPU 84 is programmed to repeatedly execute such operations for a given cycle.

In addition, the same steps as those shown in FIG. 3 bear like reference numerals in FIG. 8 for the sake of convenience.

Before entering into a detailed description of the basic sequence of operations shown in FIGS. 8 and 9, the ECU 80 is described with reference to hardware shown in FIGS. 1 and 2. With the present embodiment, the CPU 84 is programmed to receive an accelerator detection signal, representing a displacement stroke of the accelerator pedal, from the accelerator sensor 72. The ROM 86 preliminarily stores therein control program related to the accelerator detection signal.

Further, the ROM 86 of the CPU 84 preliminarily stores therein control program related to a rotational speed of the crankshaft 36, theorized during a fuel cut-off operation, and a combustible component quantity depending on a deviation between the output of the crankshaft 36 and the output of the crankshaft 36 theorized during the fuel cut-off operation.

During such a basic sequence of operations, first in step S10*a*, the CPU 84 makes judgment, based on a status where the accelerator pedal, remaining under a depressed condition, is released, to determine whether or not the diesel engine 10 belongs to a fuel cut-off mode and lies under a decelerating condition with no fuel injection. This judgment is made to prevent intake air from containing fuel, injected to the combustion chamber 12, during operation of the CPU 84 to calculate a combustible component quantity of intake air.

If the CPU 84 makes judgment in step S10*a* that the diesel engine 10 remains under the fuel cut-off mode, then, the operation proceeds to step S11. In step S11, the CPU 84 monitors an output of the diesel engine 10. To this end, the CPU 84 is programmed to receive a crank angle detection signal from the crank angle sensor 38 and monitors the rotational speed of the crankshaft 36 in response to the crank angle detection signal.

In next step S12*a*, the CPU 84 calculates a combustible component quantity of intake air, reflecting the combustible components in the crankcase 40, on the basis of a deviation between the detected output of the diesel engine 10 and a theorized output present during the fuel cut-off mode. Here, due to the absence of fuel injected to the combustion chamber 12 of the diesel engine 10 during the fuel cut-off mode, the rotational speed of the crankshaft 36 is basically deemed to attenuate. However, if intake air, passing through the intake air passage 20, contains combustible components (fuel) resulting from the combustible components in the crankcase 40, the combustible components combust in the combustion chamber 12 even under a status in the fuel cut-off mode. Therefore, the output of the diesel engine 10 becomes different from an output of the diesel engine 10 theorized in the fuel cut-off mode on the premise that intake air has no combustible component resulting from the combustible components in the crank case 40.

Figure 9:
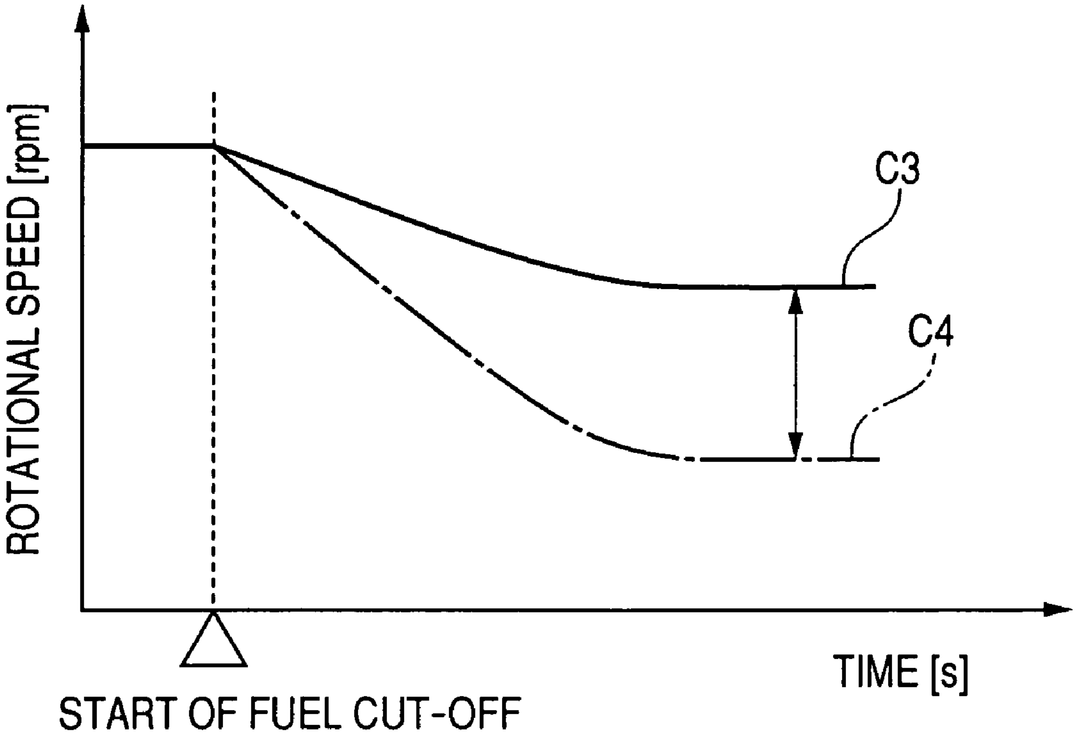
FIG. 9 is a graph showing how a rotational speed of a crankshaft of an engine attenuates during a fuel cut-off mode.

FIG. 9 exemplarily shows attenuation modes of the rotational speed of the crankshaft 36 during the fuel cut-off operation. In FIG. 9, a curve C3 shows variation in the rotational speed of the crankshaft 36 in the present of the combustible components contained in intake air and a curve C4 shows variation in the rotational speed of the crankshaft 36 with no combustible components contained in intake air. As shown in FIG. 9, under a circumstance where intake air contains the combustible components reflecting the combustible components in the crankcase 40, the rotational speed of the crankshaft 36 varies in less attenuation, as shown by the curve C3, than that of the rotational speed of the crankshaft 36 appearing when intake air has no combustible component as indicated by the curve C4.

The ROM 86 of the CPU 84 preliminarily stores therein a control map based on the curves shown in FIG. 9 to allow the CPU 84 to calculate the combustible component quantity of intake air.

Turning back to FIG. 8, in step S12*a*, the CPU 84 calculates the combustible component quantity of intake air on the basis of the control map stored in the ROM 86 and a deviation between the rotational speeds of the crankshaft 36 indicated by the curves C3, C4, respectively. The CPU 84 calculates the combustible component quantity of intake air such that the lesser the attenuating speed of the rotational speed, the greater will be the combustible component quantity of intake air. As the combustible component quantity of intake air is calculated in such a way, the CPU 84 executes the same steps S14 to S24 as those shown in FIG. 3.

The engine control system of the third embodiment has, in addition to the advantageous effect (2) to (5) of the first embodiment, an advantageous effect as described below.

(7) Upon operation of the CPU 84 to utilize the attenuating speed of the rotational speed of the crankshaft 36 during the fuel cut-off operation, the CPU 84 can calculate the combustible component quantity of intake air reflecting the combustible components in the crankcase 40.

Fourth Embodiment

An engine control system of a fourth embodiment according to the present invention is described below in detail with reference to FIG. 10. With the fourth embodiment, the engine control system takes the form of the same structure as that of the first embodiment except for several features and the present embodiment is described below with reference to the diesel engine 10 shown in FIGS. 1 and 2 with a focus on such several features.

With the fourth embodiment, the CPU 84 of the ECU 80 is programmed to calculate a combustible component quantity of intake air, reflecting the combustible components prevailing in the crankcase 40, upon commanding the EGR valve controller 52A to shut off the EGR valve 52 for zeroing an exhaust gas quantity (the amount of EGR) recirculated to the intake air passage 20 from the exhaust passage 24.

Figure 10:
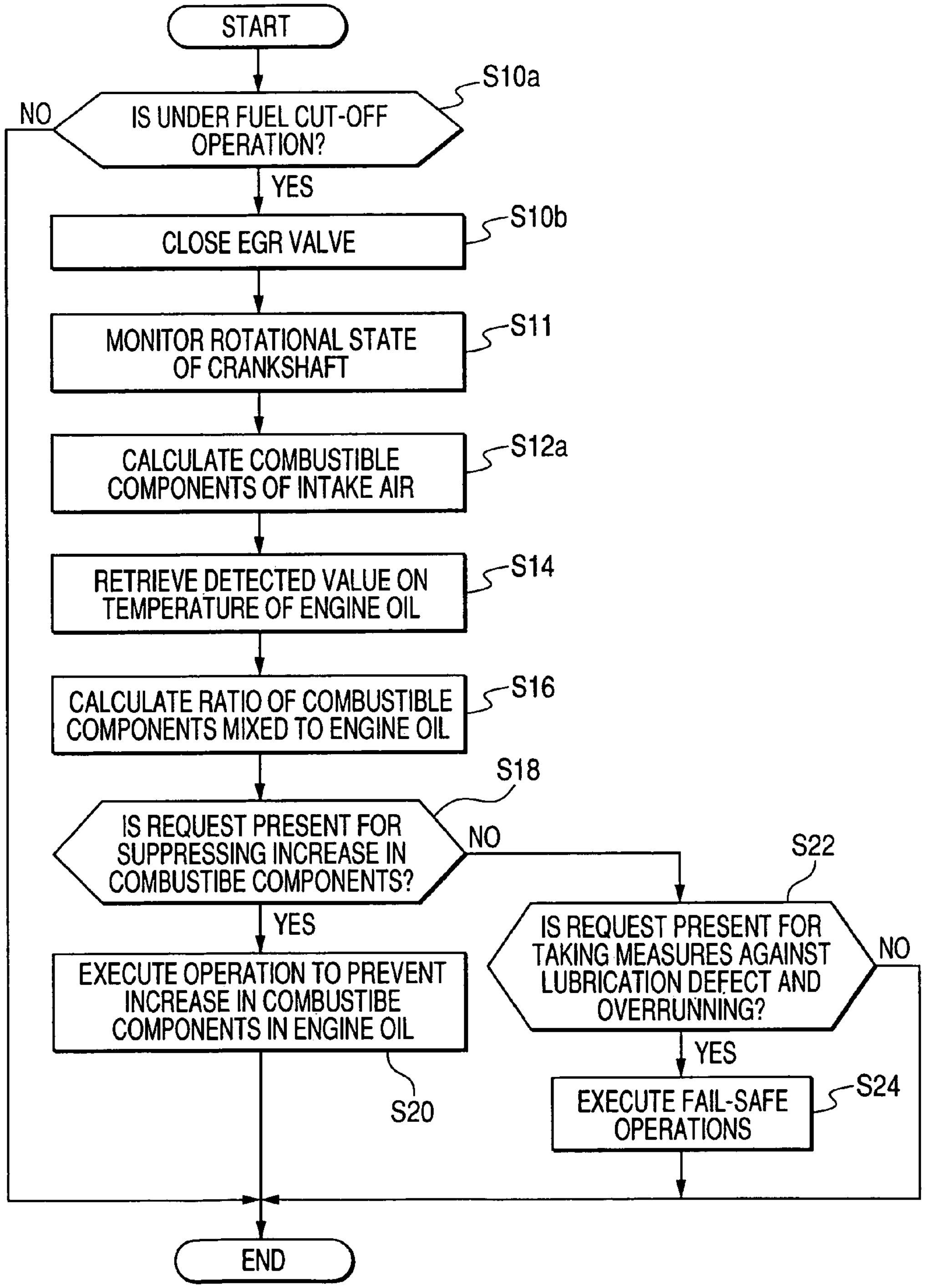
FIG. 10 is a flow chart showing a basis sequence of operations to be executed by an engine control unit of a fourth embodiment according to the present invention for illustrating how a ratio of combustible components mixed to engine oil is calculated on the basis of the detected value on the temperature of engine oil.

With the present embodiment, the CPU 84 is programmed to execute a basic sequence of operations shown in FIG. 10 for calculating a combustible component quantity of intake air, reflecting the combustible components prevailing in the crankcase 40, when the exhaust gas quantity (the amount of EGR) is zeroed upon shutting off the EGR valve 52. Such a basic sequence of operations is repeatedly executed at given cycles. In addition, the same steps as those shown in FIG. 8 bear like reference numerals in FIG. 10 for the sake of convenience.

The CPU 84 is programmed to receive the accelerator detection signal, representing the displacement stroke of the accelerator pedal, from the accelerator sensor 72. The ROM 86 preliminarily stores operating program related to the accelerator detection signal to allow the CPU 84 to make judgment whether or not the diesel engine 10 remains under the fuel cut-off mode. This is because the fuel injection valve 30 cuts off fuel to the combustion chamber 12 when the accelerator pedal is released.

Further, the ROM 86 of the CPU 84 preliminarily stores therein operating program related to the rotational speed of the crankshaft 36 to monitor the same whereby the CPU 84 calculates a combustible component quantity of intake air on the basis of the output (rotational speed) of the crankshaft 36 when the EGR valve 52 is shut off.

During such a basic sequence of operations, first in step S10*a*, the CPU 84 makes judgment based on the accelerator detection signal to determine whether or not fuel injection is cut off to cause the diesel engine 10 to fall into a decelerating condition with no fuel injection being initiated upon release of the accelerator pedal.

If the CPU 84 makes judgment in step S10*a* that the fuel injection valve 30 is inactivated to cut off fuel injection, then, the operation proceeds to step S10*b*. In step S10*b*, the CPU 84 commands the EGR valve actuator 52A to shut off the EGR valve 52. Such an EGR valve shutting off operation is executed for the purpose of preventing combustible components, contained in recirculated exhaust gas having unburned fuel (flammable) components, from adversely affecting the calculation of the combustible component quantity of intake air.

With the operation in step S10*b* being completed, then, the same operations in step S11 to S24 as those of FIG. 8 are executed in a manner described above.

The fourth embodiment, set forth above, has an advantageous effect in addition to the advantageous effects (2) to (8) of the first embodiment and the advantageous effect (7) of the third embodiment described above.

(8) Upon operation of the CPU 84 to calculate the combustible component quantity of intake air on the basis of the detected value on the output (rotational speed) of the diesel engine 10 with the EGR valve 52 being shut off, the CPU 84 can accurately calculate the combustible component quantity of intake air reflecting the combustible components in the crankcase 40.

Fifth Embodiment

An engine control system of a fifth embodiment according to the present invention is described below in detail with reference to FIG. 11. With the fourth embodiment, the engine control system takes the form of the same structure as that of the first embodiment except for several features and the present embodiment is described below with reference to the diesel engine 10 shown in FIGS. 1 and 2 with a focus on such several features.

While the fourth embodiment has been described with reference to the CPU 84 that calculates the combustible component quantity of intake air, reflecting the combustible components prevailing in the crankcase 40, under a condition where the CPU 84 commands the EGR valve controller 52A to shut off the EGR valve 52 to zero the exhaust gas quantity recirculated to the intake air passage 20 from the exhaust passage 24. In actual practice, however, during the fuel cut-off mode, a need arises sometimes for the EGR valve 52 to be actuated at opening degrees depending on the rotational speeds of the crankshaft 36. This is because of the fact that in restarting fuel injection after fuel is cut off, the EGR valve controller 52A operatively regulates the opening degrees of the EGR valve 52 depending on the operating conditions of the diesel engine 10 with a response delay occurring in actually regulated opening degrees of the EGR valve 52. For this reason, the EGR valve 52 may be preferably permitted to be open even during the fuel cut-off mode so as to open the EGR valve 52 in an improved following capability in restarting fuel injection. However, during the opening operation of the EGR valve 52, intake air passing through the intake air passage 20 is caused to contain the combustible components resulting from EGR gas. This results in a drop in calculation accuracy of the combustible component quantity of intake air reflecting the combustible components in the crankcase 40.

With the present embodiment, therefore, the CPU 84 of the ECU 80 is programmed to receive an EGR valve opening detection signal from the EGR valve opening sensor 54 and the ROM 86 preliminarily stores therein operating program related to the EGR valve opening and a combustible component quantity of intake air reflecting the combustible components in the crankcase 40. Thus, the CPU 84 is enabled to calculate an EGR quantity on the basis of an operational state, that is, the opening degree of the EGR valve 52 and enables the calculation of the combustible component quantity of intake air reflecting the combustible components in the crankcase 40 while eliminating adverse affect caused by the combustible components resulting from EGR gas. In such a way, with the CPU 84 executing the operations in steps S12*b* to S12*d* shown in FIG. 11, the CPU 84 plays a role as an exhaust gas affect eliminating section that prevents EGR gas from adversely affecting a calculation result on the combustible component quantity of intake air.

Figure 11:
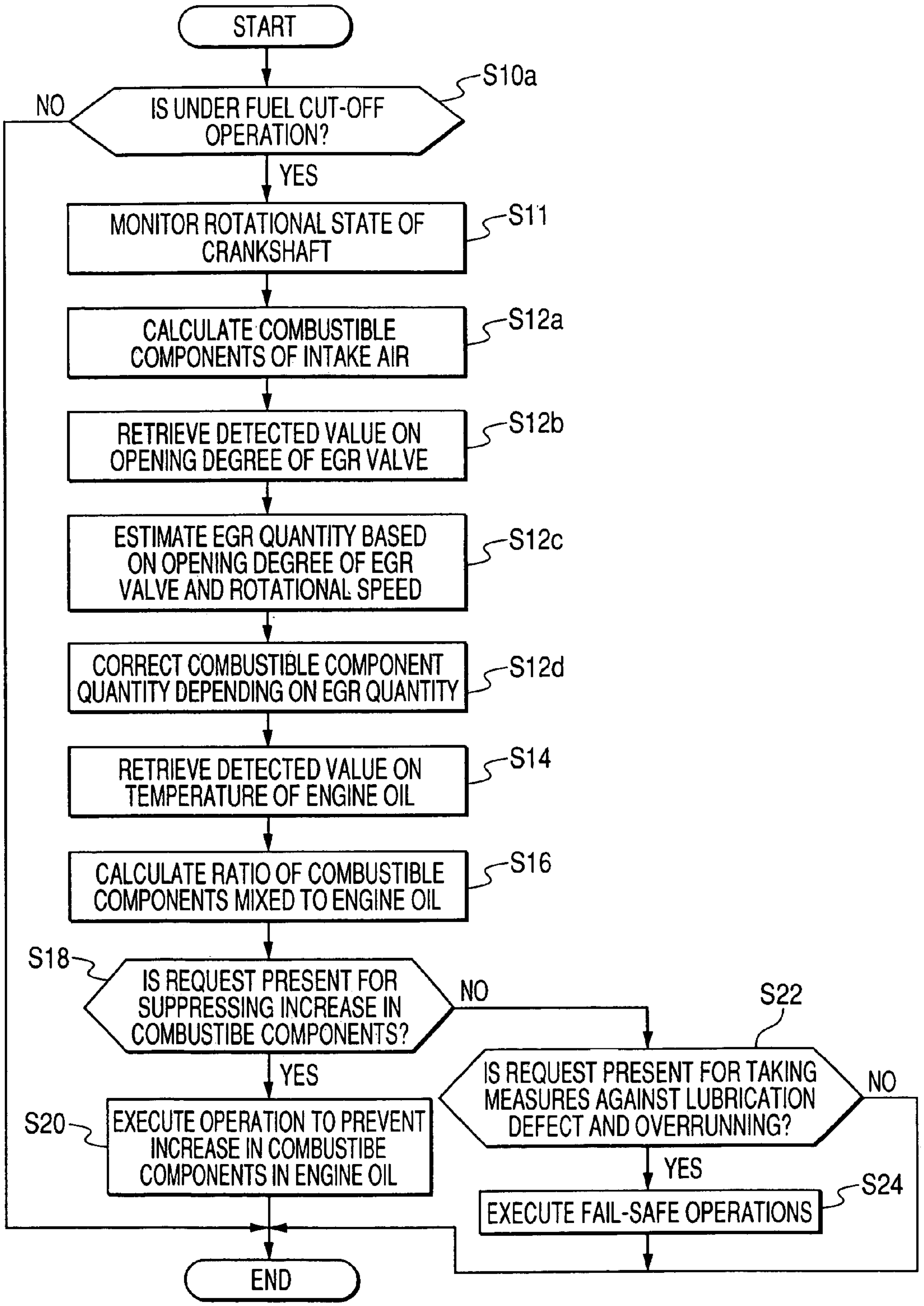
FIG. 11 is a flow chart showing a basis sequence of operations to be executed by an engine control unit of a fifth embodiment according to the present invention for illustrating how a ratio of combustible components mixed to engine oil is calculated on the basis of the detected value on the temperature of engine oil.

FIG. 11 is a basic sequence of operations to be executed by the CPU 84 for calculating a combustible component quantity of intake air according to the present embodiment. The CPU 84 repeatedly executes such a basic sequence of operations at given cycles. In addition, the same steps as those shown in FIG. 10 bear like reference numerals in FIG. 11 for the sake of convenience.

During such a basic sequence of operations, first in step S10*a* shown in FIG. 10, if the CPU 84 makes judgment based on the accelerator detection signal that the diesel engine 10 remains in the fuel cut-off mode, then, the CPU 84 executes the operations in steps S11 and S12*a*.

In next step S12*b* shown in FIG. 11, the CPU 84 retrieves a detected value on the opening degree of the EGR valve 52 on the basis of the detection signal from the EGR valve opening sensor 54. In subsequent step S12*c*, the CPU 84 estimates an EGR quantity on the basis of the detected value on the opening degree of the EGR valve 52 and the detected value on the rotational speed of the crankshaft 36 detected by the crank angle sensor 38. That is, since the EGR quantity varies not only depending on a flow passage area of the EGR passage 50 but also depending on the rotational speed of the crankshaft 36, the CPU 84 is programmed to estimate the EGR quantity on the basis of these factors.

In consecutive step S12*d*, the CPU 84 corrects the combustible component quantity of intake air on the basis of the EGR quantity estimated in step S12*c* described above. Here, such correction may be executed such that, for instance, the EGR quantity is supposed to have a predetermined proportion containing combustible components and the CPU 84 is programmed to subtract a product (acting as an affecting quantity resulting from EGR), obtained by multiplying this proportion to the EGR quantity, from the combustible component quantity calculated in step S12*a*. Moreover, in such a case, the proportion mentioned above may be preferably set to be variable depending on the operating conditions of the diesel engine 10 on the ground that the proportion of the combustible components in the EGR quantity can vary depending on the operating conditions of the diesel engine 10.

Executing the operation in step S12*d* enables the elimination of EGR gas from affecting the calculated value of the combustible component quantity of intake air caused by the combustible components in the crankcase 40. Upon completed operation of step S12*d*, the CPU 84 executes the same steps as those of steps S14 to S24 shown in FIG. 10.

The present embodiment, set forth above, can obtain the same advantageous effects as those of the forth embodiment.

Sixth Embodiment

An engine control system of a sixth embodiment according to the present invention is described below in detail with reference to FIG. 12 with a focus on features different from those of the third embodiment shown in FIGS. 8 and 9.

With the present embodiment, the CPU 84 is programmed to execute the operation to calculate a combustible component quantity using an air/fuel mixture of exhaust gas in the exhaust passage 24 as an output of the diesel engine 10.

Figure 12:
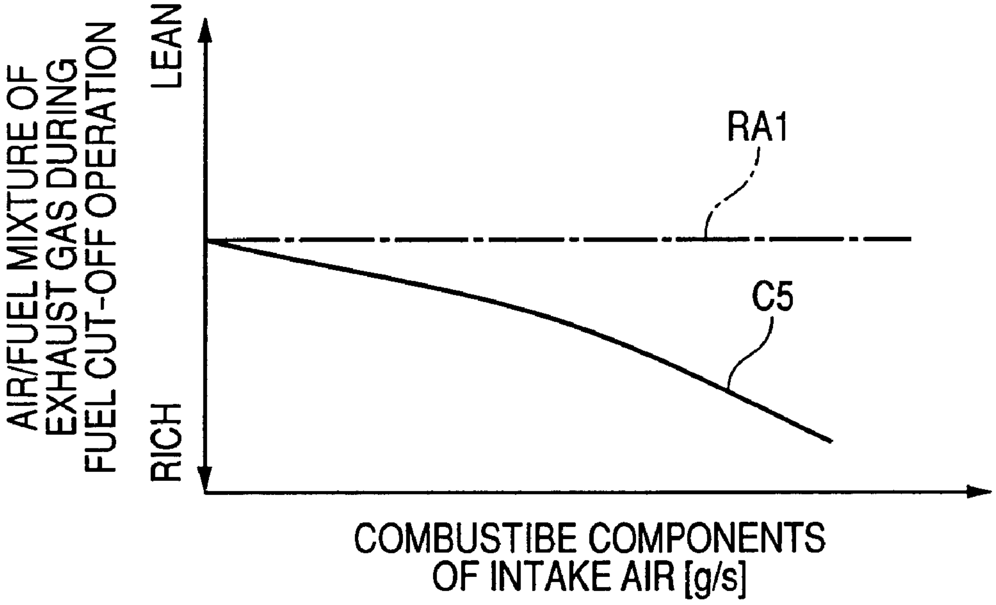
FIG. 12 is a graph showing the relationship between a combustible component quantity of intake air and a detected value of an air/fuel ratio sensor during a fuel cut-off mode for explaining an engine control system of a sixth embodiment according to the present invention.

FIG. 12 shows the relationship between the combustible component quantity of intake air during the fuel cut-off mode and the air/fuel ratio of exhaust gas detected by the air/fuel ratio sensor 64 mounted on the exhaust passage 42. In FIG. 12, a curve C5 represents variation of an air/fuel ratio of exhaust gas passing through the exhaust gas passage 24 during the fuel cut-off mode, and reference RA1 represents a reference curve indicative of a detected value on the air/fuel mixture of exhaust gas with the air/fuel mixture ratio sensor 64 exposed to the atmosphere. As shown in FIG. 12, the air/fuel mixture of exhaust gas varies such that the greater the combustible component quantity of intake air, the richer will be the air/fuel mixture of exhaust gas. Thus, the air/fuel mixture of exhaust gas becomes closer to a rich side as compared to the reference value RA1.

The ROM 86 preliminarily stores therein a control map, related to the graph shown in FIG. 12, to allow the CPU 84 to execute the operation to calculate the combustible component quantity of intake air on the basis of a deviation between the reference value RA1 and the air/fuel ratio of exhaust gas.

The present invention mentioned above can have the advantageous effects similar to those of the third embodiment.

Seventh Embodiment

An engine control system of a seventh embodiment according to the present invention is described below in detail with reference to FIG. 13 with a focus on features different from those of the third embodiment shown in FIGS. 8 and 9.

With the present embodiment, the CPU 84 is programmed to calculate the combustible component quantity using temperatures of exhaust gas as the output of the diesel engine 10.

Figure 13:
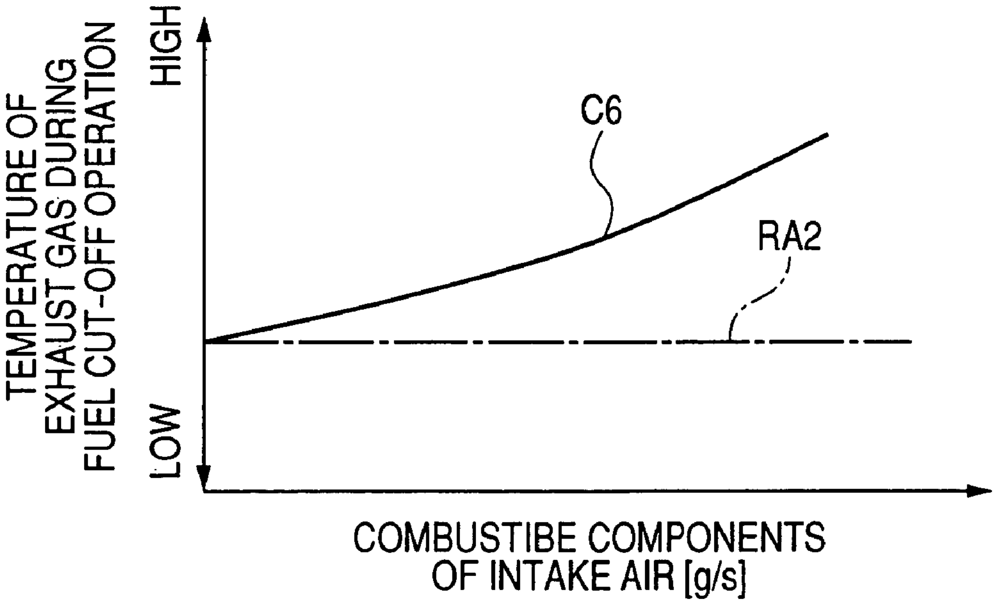
FIG. 13 is a graph showing the relationship between a combustible component quantity of intake air and a detected value on a temperature of exhaust gas upstream of an oxidizing catalyst during a fuel cut-off mode for explaining an engine control system of a seventh embodiment according to the present invention.

FIG. 13 shows the relationship between the combustible component quantity of intake air during the fuel cut-off mode and the temperature of exhaust gas passing through the exhaust gas passage 24 detected by the upstream exhaust gas temperature sensor 61. In FIG. 13, a curve C6 represents variation in the temperatures of exhaust gas in terms of the combustible component quantity of intake air, and RA2 represents a theorized reference temperature of exhaust gas appearing during the fuel cut-off mode on the premise that no combustible constituent is present in intake air. As shown in FIG. 13, the exhaust gas temperature varies such that the greater the combustible component quantity of intake air, the higher will be the exhaust gas temperature detected by the upstream exhaust gas temperature sensor 61. This is because of the fact that the greater the combustible component quantity of intake air, the higher will be the heat value of a combustion product resulting from combustion of the combustible components contained in intake air.

The ROM 86 of the CPU 84 preliminarily stores therein a control map, related to the graph shown in FIG. 13, and executes the operation to calculate the combustible component quantity of intake air on the basis of a deviation between the reference value RA2 and the exhaust gas temperature.

The present invention mentioned above can have the advantageous effects similar to those of the third embodiment.

Eighth Embodiment

An engine control system of an eighth embodiment according to the present invention is described below in detail with reference to FIG. 14 with a focus on features different from those of the third embodiment shown in FIGS. 8 and 9.

With the present embodiment, the CPU 84 is programmed to calculate a combustible component quantity using a pressure of intake air in the intake air passage 20 representing a status having the correlation with the output of the diesel engine 10.

Figure 14:
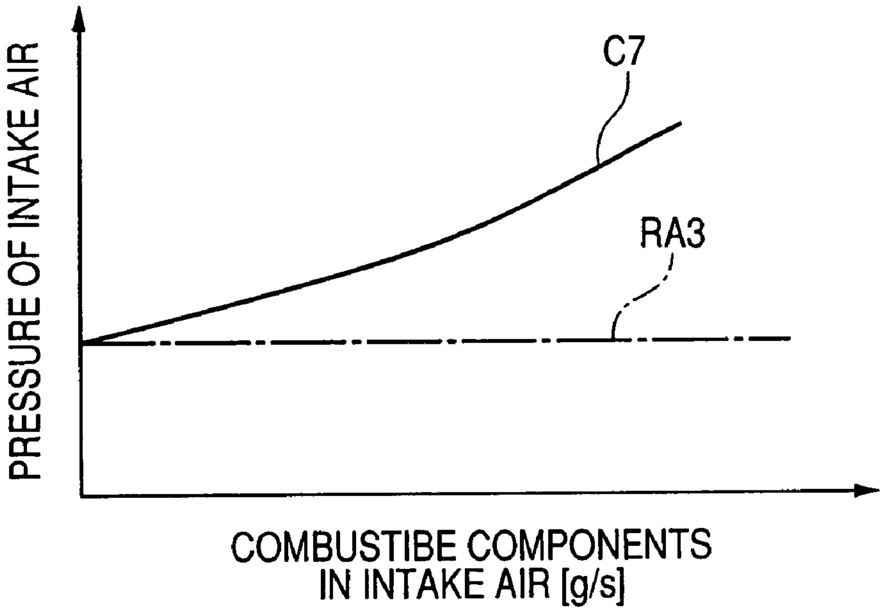
FIG. 14 is a graph showing the relationship between a combustible component quantity of intake air and a detected value on an intake air pressure during a fuel cut-off mode for explaining an engine control system of an eighth embodiment according to the present invention.

FIG. 14 shows the relationship between the combustible component quantity of intake air during the fuel cut-off mode and the pressure of intake air prevailing in the intake air passage 20 detected by the intake air pressure sensor 23. In FIG. 14, a curve C7 represents variation in the pressure of intake air prevailing in the intake air passage 20 in terms of the combustible component quantity of intake air, and RA3 represents a theorized reference pressure of intake air appearing during the fuel cut-off mode on the premise that no combustible constituent is present in intake air. As shown in FIG. 14, the pressure of intake air varies such that the greater the combustible component quantity of intake air, the higher will be the intake air pressure detected by the intake air pressure sensor 23. This is because of the fact that the greater the combustible component quantity of intake air, the higher will be the combustion energy reflecting the combustible components contained in intake air drawn into the combustion chamber 12 whereby a volume of exhaust gas increases. That is, as the volume of the exhaust gas quantity increases, a charging pressure, generated by the turbo charger 26, increases thereby increasing the pressure of intake air drawn in the intake air passage 20.

The ROM 86 of the CPU 84 preliminarily stores therein a control map, related to the graph shown in FIG. 14, to allow the CPU 84 to calculate the combustible component quantity of intake air on the basis of a deviation between the reference pressure RA3, representing the theorized intake air pressure during the fuel cut-off mode on the premise that no combustible constituent in intake air, and an actual intake air pressure.

The present invention mentioned above can have the advantageous effects similar to those of the third embodiment.

Ninth Embodiment

Figure 15:
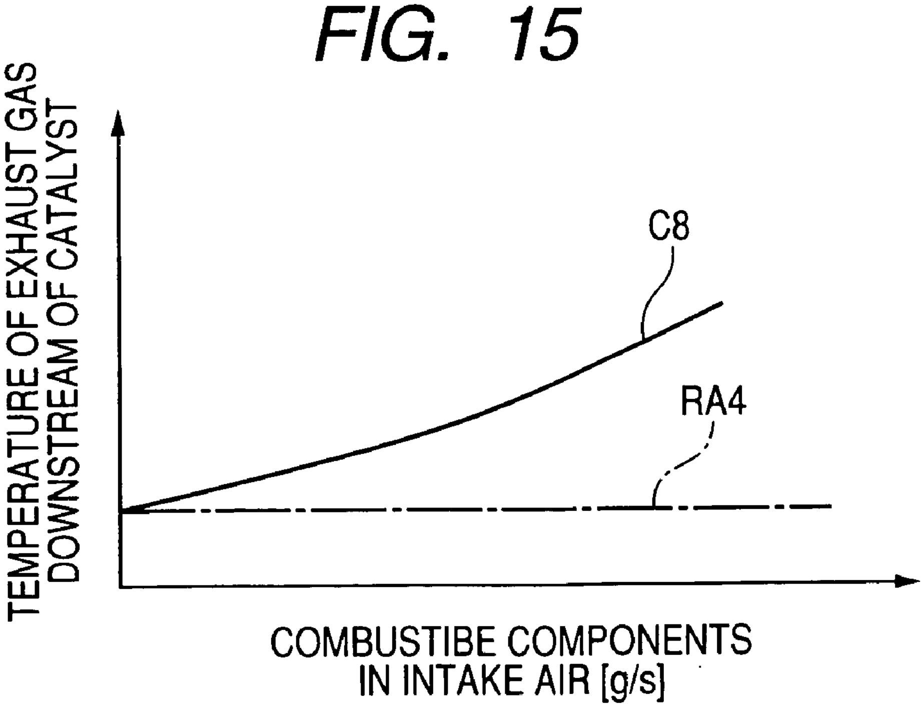
FIG. 15 is a graph showing the relationship between a combustible component quantity of intake air and a detected value on a temperature of exhaust gas downstream of an oxidizing catalyst during a fuel cut-off mode for explaining an engine control system of a ninth embodiment according to the present invention.

An engine control system of a ninth embodiment according to the present invention is described below in detail with reference to FIG. 15 with a focus on features different from those of the third embodiment shown in FIGS. 8 and 9.

With the present embodiment, the CPU 84 is programmed to calculate the combustible component quantity using temperatures of exhaust gas at an area downstream of the oxidizing catalyst 60 representing the output of the diesel engine 10. FIG. 15 shows the relationship between the combustible component quantity of intake air during the fuel cut-off mode and the temperature of exhaust gas in the exhaust gas passage 24 at the area downstream of the oxidizing catalyst 60 detected by the downstream exhaust gas temperature sensor 62. In FIG. 15, a curve C8 represents variation of the temperature of exhaust gas in the exhaust gas passage 24 at the area downstream of the oxidizing catalyst 60 in terms of the combustible component quantity of intake air, and RA4 represents a theorized reference temperature of exhaust gas in the exhaust gas passage 24 at the area downstream of the oxidizing catalyst 60 appearing during the fuel cut-off mode on the premise that no combustible constituent is present in intake air. As shown in FIG. 15, the exhaust gas temperature in the exhaust gas passage 24 at the area downstream of the oxidizing catalyst 60 varies such that the greater the combustible component quantity of intake air, the higher will be the exhaust gas temperature detected by the downstream exhaust gas temperature sensor 62. This is because of the fact that the greater the combustible component quantity of intake air, the greater will be the combustible components (unburned fuel) emitted to the exhaust gas passage 24 with the combustible components being oxidized on the oxidizing catalyst 60 to develop increased oxidizing heat.

Figure 17:
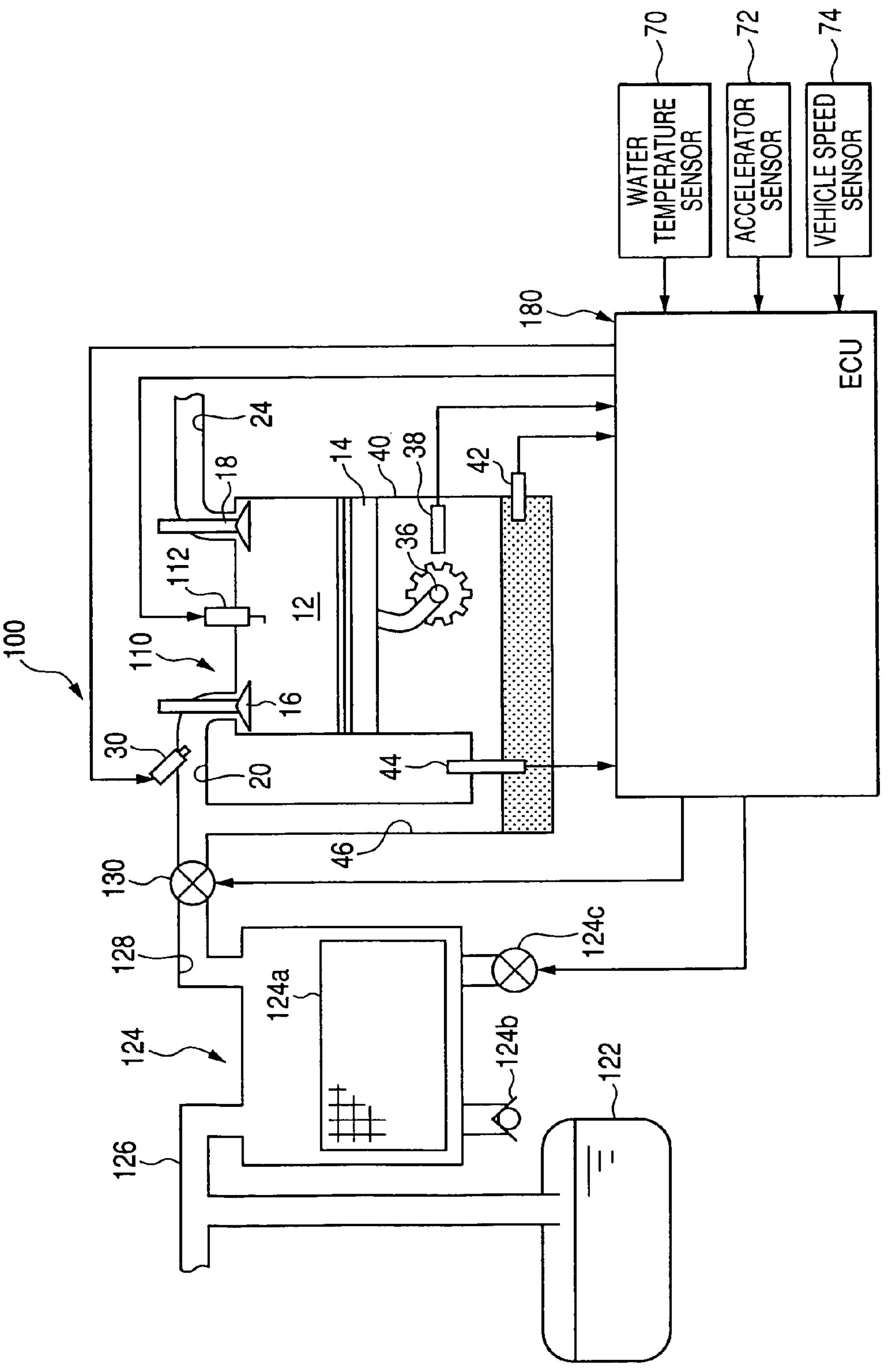
FIG. 17 is a schematic view showing an overall structure of an engine control system of an eleventh embodiment according to the present invention.

The ROM 86 of the CPU 84 preliminarily stores therein a control map, related to the graph shown in FIG. 17, to allow the CPU 84 to calculate the combustible component quantity of intake air on the basis of a deviation between the reference value RA4 and the exhaust gas temperature in the exhaust gas passage 24 at the area downstream of the oxidizing catalyst 60.

The present invention mentioned above can have the advantageous effects similar to those of the third embodiment.

Tenth Embodiment

Figure 16:
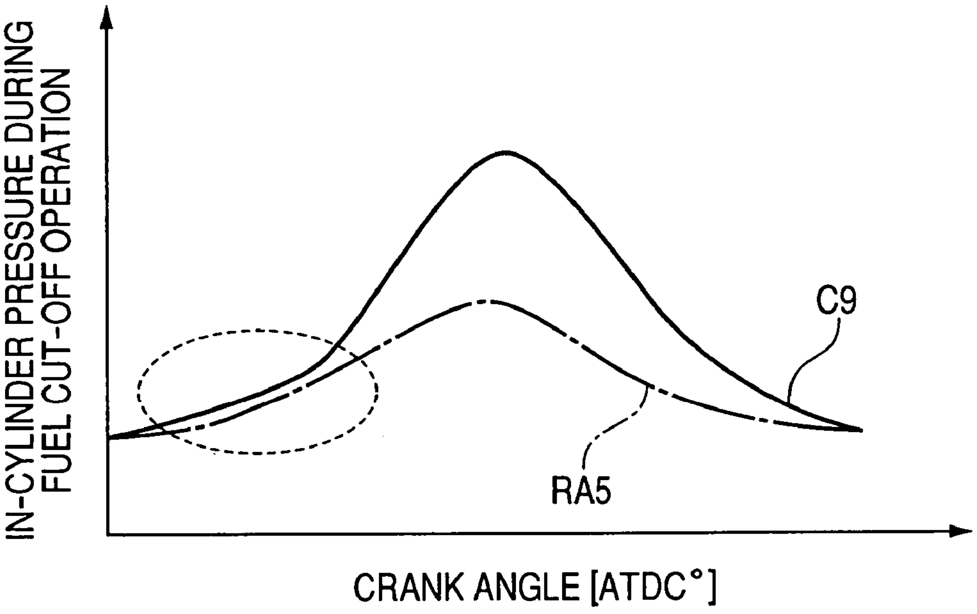
FIG. 16 is a graph showing the relationship between a combustible component quantity of intake air and a detected value on an in-cylinder pressure of an engine during a fuel cut-off mode for explaining an engine control system of a tenth embodiment according to the present invention.

An engine control system of a tenth embodiment according to the present invention is described below in detail with reference to FIG. 16 with a focus on features different from those of the third embodiment shown in FIGS. 8 and 9.

With the present embodiment, the CPU 84 is programmed to calculate the combustible component quantity using an internal pressure (referred to as an in-cylinder pressure) of the combustion chamber 12 as a status having the correlation with the output of the diesel engine 10. FIG. 16 shows the relationship between the in-cylinder pressure, detected by the in-cylinder pressure sensor 32, and a crank angle [ATDC°] of the crankshaft 36. In FIG. 16, a curve C9 represents variation of the in-cylinder pressure in the presence of the combustible components of intake air, and RA5 represents variation of a theorized reference in-cylinder pressure during the fuel cut-off mode on the premise that no combustible constituent is present in intake air. As shown in FIG. 16, the in-cylinder pressure varies such that the greater the combustible component quantity of intake air, the higher will be the in-cylinder pressure resulting from the movement of the piston 14 rising to a top dead center in compression stroke. This is because of the fact that the greater the combustible component quantity of intake air, the greater will be the combustion energy reflecting the combustible components contributed to the combustion in the combustion chamber 12.

Figure 18:
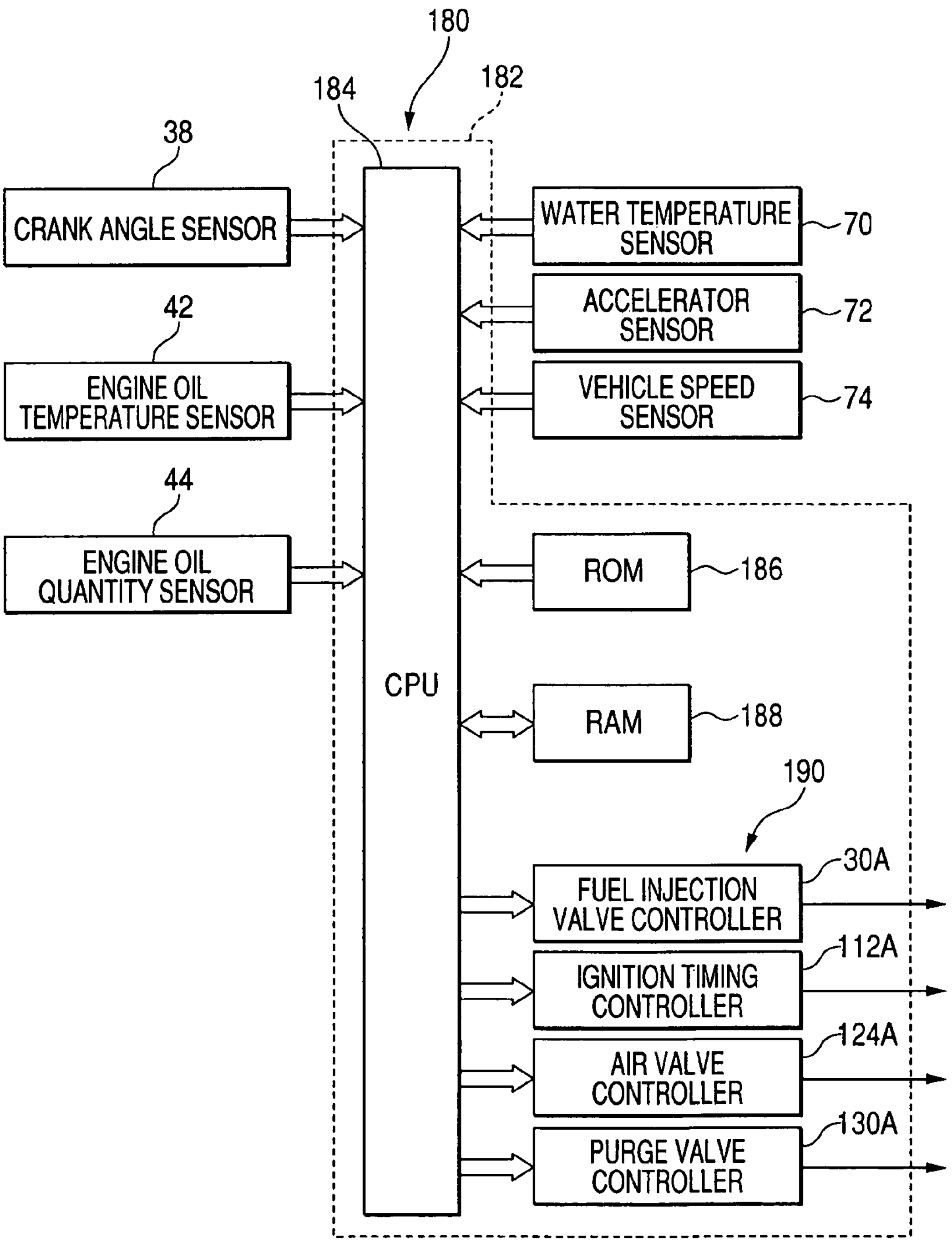
FIG. 18 is a block diagram showing a detailed example of an engine control unit (ECU) incorporated in the engine control system of the eleventh embodiment shown in FIG. 17.

The ROM 86 of the CPU 84 preliminarily stores therein a control map, related to the graph shown in FIG. 18, to allow the CPU 84 to calculate the combustible component quantity of intake air on the basis of the relationship between the amount of deviation between a behavior, indicated by RA5, of the theorized cylinder pressure during the fuel cut-off mode on the premise that no combustible components are present in intake air and an actual behavior of the in-cylinder pressure indicated by the curve C9, and the combustible component quantity of intake air.

More particularly, the CPU 84 may be programmed to calculate the combustible component quantity of intake air on the basis of the amount of deviation between the amount of rise in the theorized cylinder pressure and the amount of rise in actual cylinder pressure. Further, for instance, the ROM 86 of the CPU 84 may preliminarily stores therein data related to polytropic exponent and the degree, represented by RA5, of rise in the in-cylinder pressure when the in-cylinder pressure increases to allow the CPU 84 to calculate polytropic exponent on the basis of the degree of rise in the cylinder pressure when the in-cylinder pressure increases upon which the CPU 84 calculates the combustible component quantity of intake air on the basis of a deviation between the calculated polytropic exponent and theorized polytropic exponent.

In particular, the ROM 86 of the CPU 84 may include a logic for calculating polytropic exponent based on a sampling value of the pressure when the cylinder pressure increases and a map defining the relationship between the calculated value resulting from the logic and the combustible component quantity of intake air.

The present invention mentioned above can have the advantageous effects similar to those of the third embodiment.

Eleventh Embodiment

Now, an engine control system of an eleventh embodiment according to the present invention is described below in detail with reference to FIGS. 17 to 19.

Figure 19:
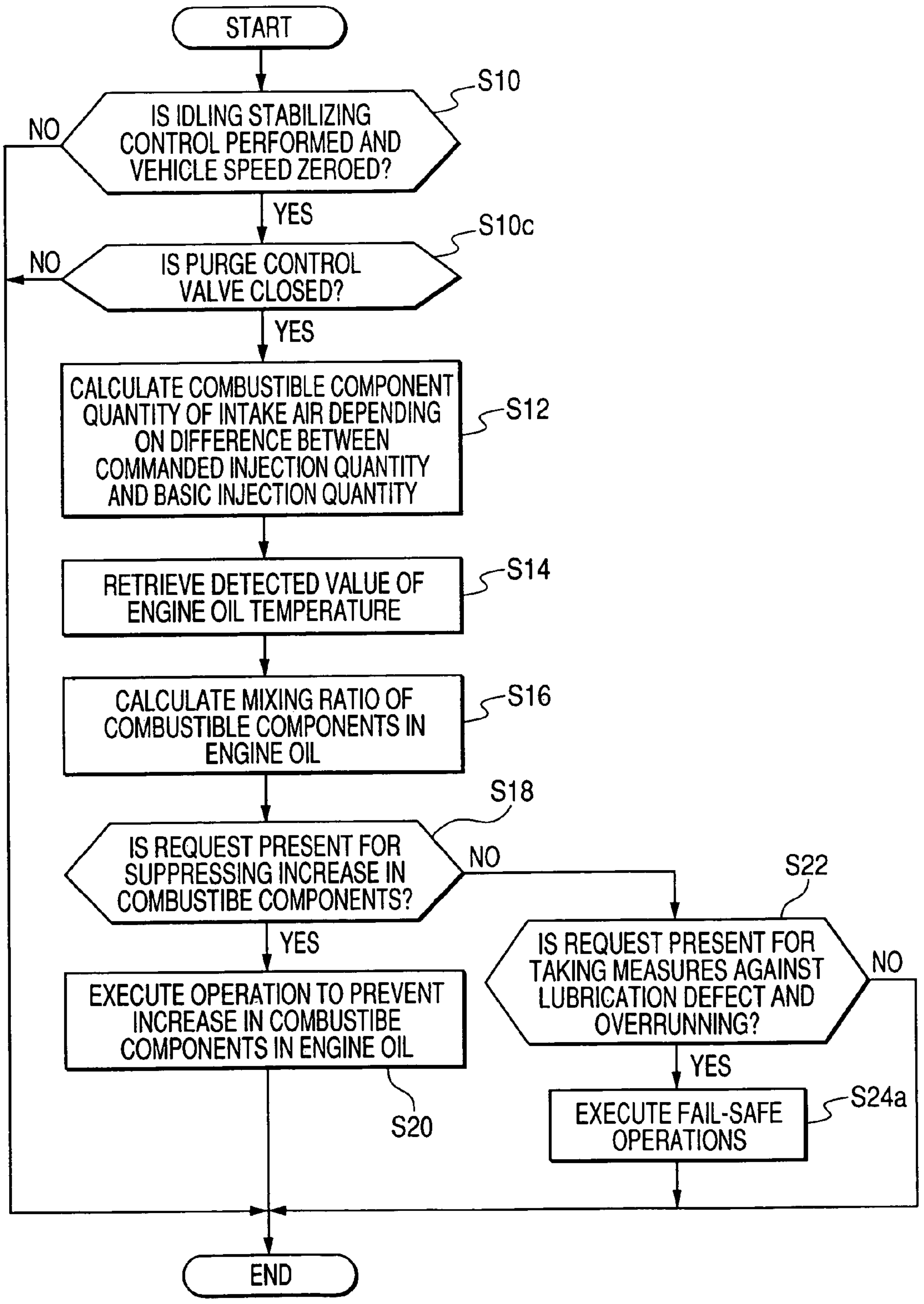
FIG. 19 is a flow chart showing a basis sequence of operations to be executed by the engine control unit of the engine control system shown in FIG. 17.

The engine control system 100 of the present embodiment differs from the engine control system shown in FIG. 1 in that the diesel engine 10 is replaced by a gasoline engine 110 as shown in FIG. 19. The same reference numerals as those of the engine control system of the first embodiment bear like reference numerals as those used in FIG. 1.

As shown in FIG. 17, the gasoline engine 110 includes the fuel injection valve 30 mounted in the intake air passage 20 at a position immediately upstream of the intake port 16. The engine block carries thereon an ignition plug 112 that protrudes into the combustion chamber 12.

The engine control system 100 of the present embodiment further comprises an evaporation purge system 120 that collects evaporative fuel (Evapo) generated in a fuel tank 122 to suitably purge collected evaporative fuel to the intake air passage 20. The evaporation system 120 includes a canister 124 for collecting evaporative fuel generated in the fuel tank 122, a vapor passage 126 through which the fuel tank 122 and the canister 124 are connected to each other, a purge passage 128 through which the canister 124 and the intake air passage 20 are connected to each other, and a purge control valve 130 for regulating a flow passage area between the purge passage 128 and the intake air passage 20.

The canister 124 incorporates absorbent **124*a* composed of activated carbon or the like for temporarily storing and absorbing evaporative fuel. Evaporated fuel absorbed in absorbent 124*a* is removed again from the canister 124** upon reducing a pressure of internal space hereof.

Further, the canister 124 includes an atmospheric valve **124*b*, operative to appropriately absorb or release evaporative fuel, which is opened when the internal pressure of the canister 124 exceeds a given pressure higher than the atmospheric pressure to release excessive air from the canister 124. In addition, the canister 124 includes an atmospheric air intake valve 124*c*, composed of for instance an electromagnetic valve, which is operative to introduce atmospheric air into the canister 124**.

With such a structure mentioned above, evaporative fuel absorbed by absorbent **124*a* of the canister 124 is released upon opening operations of the atmospheric air introduction valve 124*c* and the purge control valve 130 to cause a reduction in internal pressure of the canister 124. This allows evaporative fuel to be purged to the intake air passage 20**.

With the engine control system 100 of the gasoline engine 110 equipped with the canister system 120, a combustible component quantity of intake air contain evaporative fuel purged from the canister 124. For this reason, if the combustible component quantity of intake air is calculated upon executing the basic sequence of operations shown in FIG. 3, then, there is a fear of the occurrence of a calculation result adversely affected with evaporative fuel purged from the canister 124.

As shown in FIG. 18, the engine control system 100 includes an ECU 180 composed of a microcomputer 182 that includes a CPU 184, a ROM 186 and a RAM 188. The CPU 184 is programmed to receive detection signals from the crank angle sensor 38, the engine coil temperature sensor 42 and the engine oil quantity sensor 44 and calculates the combustible component quantity when the purge control valve 130 is closed to block the flow of evaporative fuel from the canister 124 to the intake air passage 20. The, the CPU 184 generates various command signals that are supplied to a fuel injection valve controller 30A, an ignition timing controller 112A, an air valve controller 124A and a purge control valve controller 130A, connected to the fuel injection valve 30, an ignition plug 112, the atmospheric air intake valve **124*c* and the purge control valve controller 130A, respectively, which act as an engine performance upgrading device 190 through which various measures are taken against a lubrication defect and overrunning of the engine 10** in a manner as will be described below in detail.

The CPU 184 is programmed to execute a basic sequence of operations for calculating a combustible component quantity of intake air. This basic sequence of operations is repeatedly executed at given intervals. The same steps as those of FIG. 3 bear like reference numerals for the sake of convenience.

The CPU 184 is applied with the vehicle speed detection signal from the vehicle speed sensor 74. The ROM 86 preliminarily stores operating program related to the relationship between the vehicle speed detection signal and an operating status of the purge control valve 130.

First in step S10 shown in FIG. 19, the CPU 184 makes judgment based on the vehicle speed detection signal to determine whether or not fuel injection is cut off to cause the gasoline engine 110 to fall into addling stabilizing control and the vehicle speed is zeroed.

If the CPU 184 makes judgment in step S10 that the gasoline engine 110 remains under addling stabilizing control and the vehicle speed is zeroed, then, the operation goes to step S10*c*. In step S10*c*, the CPU 184 makes judgment whether or not the purge control valve 130 is closed. In step S10*c*, if judgment is made that the purge control valve 130 is closed, then, the CPU 184 executes the same operations as those of steps S12 to S22 in FIG. 3 and step S24*a* shown in FIG. 19. As already described above with reference to the flow chart of operations shown in FIG. 3, the CPU 184 executing the operation in step S12 plays a role as a calculating section for calculating a combustible component quantity of intake air. Also, the CPU 184 executing the operations in steps S14 and S16 plays a role as a fuel injection affect eliminating section for preventing combustible components in the crankcase 40 from adversely affecting a calculated result on the combustible component quantity of intake air. In step S24*a*, the CPU 184 executes a fail-safe operation on the gasoline engine 110 to limit output torque thereof when a need arises to take measure against overrunning of the gasoline engine 110. In particular, the CPU 184 commands the fuel injection valve controller 30A to limit the amount of fuel injected to the intake air passage 30 so as to prevent the overrunning of the gasoline engine 110. However, a mode of limiting the amount of fuel through the fuel injection valve 30 may be replaced by a mode of limiting the amount of intake air supplied into the combustion chamber 120 through the use of a throttle valve and a throttle valve actuator adapted to be controlled a throttle valve controller (not shown) commanded by the CPU 184.

The engine control system 100 of the present embodiment has an advantageous effect in addition to the advantageous effects mentioned above.

(9) With the CPU 184 programmed to calculate the combustible component quantity of intake air upon closing the purge control valve 130 (purge passage 128) that regulates the flow passage area between the canister 124, which collects evaporative fuel, and the intake air passage 20, the combustible component quantity of intake air can be calculated with no adverse affect from the combustible components contained in purged air.

(Modified Forms)

The various embodiments may be preferably implemented in modified forms described below.

The first embodiment may be preferably altered to execute the same operations as those of the fourth and fifth embodiments so as to remove the influence of the EGR quantity adversely affecting an accuracy of calculating the combustible component quantity of intake air.

The seventh to tenth embodiments may be preferably altered to execute the same operations as those of the fourth and fifth embodiments so as to remove the influence of the EGR quantity adversely affecting an accuracy of calculating the combustible component quantity of intake air.

The eleventh embodiment may be preferably altered to execute the operations to calculate the combustible component quantity of intake air upon using the learning value for compensating variation in fuel injection characteristic of the fuel injection valve 30 during idling stabilizing control. However, since the learning value is preferable to compensate only the variation in fuel injection characteristic of the fuel injection valve 30, it is preferable to calculate the combustible component quantity of intake air immediately after engine oil 41 is replaced. This can be realized upon using an initial learning value or using a learning value when the number of learning times after replacement is less than a given value.

The eleventh embodiment may be preferably altered such that the gasoline engine 110 further includes an exhaust gas recirculation system to recirculate exhaust gas to the intake air passage with an EGR valve rendered operative through the use of an actuator. With such an alternative, the CPU 84 may be programmed to execute the operations so as to remove the influence of the EGR quantity, adversely affecting an accuracy of calculating the combustible component quantity of intake air, in the same manner as those of the fourth and fifth embodiments.

The method of calculating the combustible component quantity of intake air of the gasoline engine 110 is not limited to the operation to be executed during idling stabilizing control. For instance, the CPU 184 may be programmed to execute the operation for calculating the combustible component quantity of intake air during a fuel cut-off mode based on the third to tenth embodiments mentioned above. However, even if the combustible components are present in intake air drawn to the combustion chamber 12 of the gasoline engine 110, the gasoline engine 110 encounters a difficulty in combusting the combustible components in the combustion chamber 12 in the absence of the ignition of the ignition plug 112. In such a case, the CPU 184 may be preferably programmed to command the ignition timing controller 112A to cause the ignition plug 112 to be activated initiating a spark discharge even during the fuel cut-off mode.

The method of calculating the combustible component quantity of intake air on the basis of the rotational state of the engine or the deviation between the theorized rotational state and the detected value is not limited to that exemplified in the embodiments described above. For instance, the CPU 184 may be preferably programmed to calculate the combustible component quantity of intake air on the basis of a deviation between the amount of rise in the rotational speed of the crankshaft 36, caused when the fuel injection valve 30 initiates one-shot of fuel injection during the fuel cut-off mode, and the theorized amount of rise in the rotational speed of the crankshaft 36 caused when the fuel injection valve 30 initiates one-shot of fuel injection in the absence of the combustible components in intake air reflecting the combustible components present in the crankcase 40. Further, with the eleventh embodiment, the CPU 184 may be preferably programmed to calculate the combustible component quantity of intake air, resulting from blow-by gas drawn from the crankcase 40, on the basis of a deviation between the amount of displacements, occurring during air/fuel ratio feed-back control when the EGR valve 52 and the purge control valve 130 remain closed, and the amount of displacements treated as a theorizing reference in the absence of the combustible components in intake air resulting from blow-by gas drawn from the crankcase 40. That is, it is conceived that under a circumstance where a commanded fuel injection quantity, determined by air/fuel ratio feed-back control, is constantly deviated to a rich side with respect to a reference value of an injection quantity to achieve a theoretical air/fuel ratio, such deviation results from the combustible components in intake air resulting from blow-by gas drawn from the crankcase 40. Accordingly, if judgment can be made that such a steady deviation is not caused by the injection characteristic, that is, when the steady deviation is rapidly shifted to a rich side, it becomes possible to calculate the combustible component quantity of intake air reflecting the combustible components present in the crankcase 40.

While the various embodiments have been described above with reference to an example wherein the region γ is made to include the sum of sets of the region, which needs to take measure against lubrication defect, and the region, which needs to take measure against the overrunning, and specified with the mixing ratio of the combustible components and the temperatures of engine oil 41, the present invention is not limited to such a concept. For instance, if measure need to be taken against the lubrication defect, lubricating performance of engine oil 41 strictly depends on the temperature of engine oil 41 in an area near the piston 14 and the cylinder wall surface 12*c*. This temperature has correlation with the temperature of coolant water detected by the coolant water sensor 70. The region, which needs to take measure against the lubrication defect, may be determined on the basis of the temperature detected by the oil temperature sensor 42, the temperature detected by the water temperature sensor 70 and the calculated mixing ration. In addition, if the temperature of engine oil 41 in the area close proximity to the piston 14 and the cylinder wall surface 12*c* is calculated on the basis of the temperature detected by the oil temperature sensor 42 and the water temperature sensor 70, the relevant region can be specified to be convenient based on two parameters including the calculated temperature and the mixing ratio.

Moreover, since the temperature detected by the water temperature sensor 70 has the correlation with the temperature of engine oil 41 inside the crankcase 40, the respective regions may be simply specified on the basis of the temperature detected by the water temperature and the mixing ratio.

While the various embodiments have been described above with reference to an example wherein the calculated result on the combustible component quantity of intake air reflecting the combustible components inside the crankcase 40 is utilized in calculating the ratio of the combustible components mixed to engine oil 41, the present invention is not limited thereto. For instance, the calculated result on the combustible component quantity of intake air reflecting the combustible components inside the crankcase 40 may be utilized in getting a combustion condition of injected fuel.

The structure of the engine control system may not be limited to the structures shown in FIG. 1 and 19 and may be implemented in various alternatives.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. An engine control system for controlling an engine having an intake air system through which air is drawn, a fuel injection valve for performing fuel injection to supply fuel into a combustion chamber, and a crankcase filled with engine oil, the engine control system comprising:

detecting means for detecting at least one of an output of the engine and a status correlated to the output to provide a detected value;

calculating means for calculating a combustible component quantity of intake air, resulting from combustible components prevailing in the crankcase, on the basis of the detected value and providing a commanded fuel injection quantity depending on the detected value; and controlling means for controlling the fuel injection valve depending on the commanded fuel injection quantity so as to perform the fuel inject to supply fuel into the combustion chamber to allow the engine to provide a demanded output;

wherein the calculating means includes fuel injection affect eliminating means for eliminating an adverse affect on the calculation result of the combustible component quantity resulting from fuel injected to the combustion chamber by the fuel injection valve in response to the commanded fuel injection quantity.

2. The engine control system according to 1, wherein:

the detecting means comprises a sensor for detecting a rotational state of the engine; and the calculating means calculates the combustible component quantity on the basis of a deviation between an actual operation quantity of the fuel injection valve, required for the rotational state of the engine to be feedback controlled to a target rotational state, and a basic operation quantity of the fuel injection valve.

3. The engine control system according to 2, further comprising:

learning means for learning a learning value for compensating variation in an injection characteristic of the fuel injection valve; and wherein the calculating means renders the controlling means operative to operate the fuel injection valve using the learning value during feedback control.

4. The engine control system according to 3, wherein:

the engine comprises a diesel engine; and wherein:

the controlling means comprises means for permitting the fuel injection valve to execute a main fuel injection for obtaining a demanded torque and an aft fuel injection subsequent to the main injection;

the learning means obtains the learning value during a period from time at which the engine oil of the diesel engine is replaced to time at which the subsequent fuel injection is executed; and the calculating means continuously uses the learning value during a period in which the replaced engine oil is under use.

5. The engine control system according to 1, wherein:

the detecting means comprises at least one of means for detecting an oxygen concentration of oxygen in exhaust gas of the engine, means for detecting a temperature of the exhaust gas of the engine and means for detecting an internal pressure of the combustion chamber.

6. The engine control system according to 1, wherein:

the injection affect eliminating means comprises initiating means for permitting the calculating means to perform calculation when the controlling means inactivate the fuel injection valve to stop injecting the fuel.

7. The engine control system according to 6, wherein:

the detecting means comprises at least one of means for detecting a rotational state of the engine, means for detecting an oxygen concentration of oxygen in exhaust gas of the engine, means for detecting a temperature of the exhaust gas of the engine and means for detecting an internal pressure of the combustion chamber; and the calculating means performs the calculation on the basis of a deviation between the detected value of the detecting means, theorized when the fuel injection is stopped, and a relevant actually detected value.

8. The engine control system according to 6, wherein: the engine comprises a supercharger; the detecting means comprises means for detecting a pressure of the intake air system of the engine; and the calculating means calculates the combustible component quantity on the basis of an amount of rise of a detected pressure on the pressure of the intake air system theorized when the fuel injection is stopped.

9. The engine control system according to 1, wherein: the engine comprises a diesel engine.

10. The engine control system according to 1, wherein: the engine comprises a gasoline engine having an intake air passage communicating with a fuel tank, a canister disposed between the fuel tank and the combustion chamber for collecting evaporative fuel, and a purge control valve operative to regulate a flow passage area between the canister and the intake system; and the calculating means performs the calculation when the purge control valve is closed.

11. The engine control system according to 1, wherein: the engine comprises an exhaust gas recirculation system for recirculating exhaust gas to the intake air system, and an actuator for regulating an amount of exhaust gas recirculated to the intake air system through the exhaust gas recirculation system; and the calculating means further includes exhaust gas affect eliminating means for preventing recirculated exhaust gas from adversely affecting the calculation result on the basis of an operational state of the actuator.

12. The engine control system according to 11, wherein: the exhaust gas affect eliminating means allows the calculating means to perform the calculation on the basis of the detected value of the detecting means appearing when the amount of exhaust gas to be recirculated is zeroed upon operation of the actuator.

13. The engine control system according to 1, wherein: the detecting means comprises means for detecting at least one of a temperature of the engine oil and a corresponding value representing the temperature of the engine oil to provide a temperature detection value; and the calculating means further includes means for calculating at least one of a mixing ratio of combustible components, mixed to the engine oil, and a corresponding value representing the mixing ratio on the basis of the combustible component quantity, calculated by the calculating means, and the temperature detection value.

14. The engine control system according to 13, wherein: the controlling means is operative to execute at least one of a first step of increasing an amount of intake air drawn to the combustion chamber, a second step of increasing a temperature of the engine oil, a third step of limiting the fuel injection quantity and a fourth step of regulating at timing, at which the fuel injection valve executes the fuel injection, on the basis of at least one of the mixing ratio of the combustible components, the temperature of the engine oil and the corresponding value representing the temperature of the engine oil for thereby preventing an increase in a quantity of combustible components in the engine oil.

15. The engine control system according to 13, wherein: the controlling means is operative to execute at least one of a first step of limiting a rotational speed of the engine and a second step of limiting an output torque of the engine on the basis of at least one of the mixing ratio of the combustible components, the temperature of the engine oil and the corresponding value representing the temperature of the engine oil for thereby taking a measure against a lubrication defect of the engine oil.

16. The engine control system according to 13, wherein: the controlling means is operative to limit at least one of an intake air quantity of the engine and a fuel injection quantity on the basis of at least one of the mixing ratio of the combustible components, the temperature of the engine oil and the corresponding value representing the temperature of the engine oil for thereby suppressing an excess of an output torque of the engine.

17. A method of controlling an engine having an intake air system through which air is drawn, a fuel injection valve for performing fuel injection to supply fuel into a combustion chamber, and a crankcase filled with engine oil, the method comprising the steps of:

detecting at least one of an output of the engine and a status correlated to the output to provide a detected value;

calculating a combustible component quantity of intake air, resulting from combustible components prevailing in the crankcase, on the basis of the detected value and providing a commanded fuel injection quantity depending on the detected value; and controlling the fuel injection valve depending on the commanded fuel injection quantity so as to perform the fuel inject to supply fuel into the combustion chamber to allow the engine to provide a demanded output;

wherein the step of calculating the combustible component quantity includes eliminating a fuel injection adverse affect on the calculation result of the combustible component quantity resulting from fuel injected to the combustion chamber by the fuel injection valve in response to the commanded fuel injection quantity.

18. The method of controlling the engine according to 17, wherein:

the step of detecting the engine parameters comprises detecting a rotational state of the engine; and the step of calculating the combustible component quantity of intake air comprising calculating the combustible component quantity on the basis of a deviation between an actual operation quantity of the fuel injection valve, required for the rotational state of the engine to be feedback controlled to a target rotational state, and a basic operation quantity of the fuel injection valve.

19. The method of controlling the engine according to 18, further comprising the step of:

learning a learning value for compensating variation in an injection characteristic of the fuel injection valve; and wherein the step of controlling the fuel injection valve allows the fuel injection valve to be opened using the learning value during feedback control.

20. The method of controlling the engine according to 19, wherein:

the engine comprises a diesel engine; and wherein:

the step of controlling the fuel injection valve allows the fuel injection valve to execute a main fuel injection for obtaining a demanded torque and an aft fuel injection subsequent to the main injection;

the step of learning the learning value allows the learning value to be obtained during a period from time at which the engine oil of the diesel engine is replaced to time at which the subsequent fuel injection is executed; and the step of calculating the combustible component quantity of intake air continuously uses the learning value during a period in which the replaced engine oil is under use.

21. The method of controlling the engine according to 17, wherein:

the step of detecting the engine parameters comprises at least one of detecting an oxygen concentration of oxygen in exhaust gas of the engine, detecting a temperature of the exhaust gas of the engine, and detecting an internal pressure of the combustion chamber.

22. The method of controlling the engine according to 17, wherein:

the step of eliminating an adverse affect on the calculation result of the combustible component quantity comprises permitting the step of calculating the combustible component quantity to be executed when the fuel injection valve is made inoperative to stop injecting the fuel.

23. The method of controlling the engine according to 22, wherein:

the step of detecting the engine parameters comprises at least one of detecting a rotational state of the engine, detecting an oxygen concentration of oxygen in exhaust gas of the engine, detecting a temperature of the exhaust gas of the engine, and detecting an internal pressure of the combustion chamber; and the step of calculating the combustible component quantity of intake air is executed on the basis of a deviation between the detected value, theorized when the fuel injection is stopped, and a relevant actually detected value.

24. The method of controlling the engine according to 22, wherein:

the engine comprises a supercharger;

the step of detecting the engine parameters comprises detecting a pressure of the intake air system of the engine; and the step of calculating the combustible component quantity of intake air is executed to calculate the combustible component quantity on the basis of an amount of rise of a detected pressure on the pressure of the intake air system theorized when the fuel injection is stopped.

25. The method of controlling the engine according to 17, wherein:

the engine comprises a diesel engine.

26. The method of controlling the engine according to 17, wherein:

the engine comprises a gasoline engine having an intake air passage communicating with a fuel tank, a canister disposed between the fuel tank and the combustion chamber for collecting evaporative fuel, and a purge control valve operative to regulate a flow passage area between the canister and the intake system; and the step of calculating the combustible component quantity of intake air is executed when the purge control valve is closed.

27. The method of controlling the engine according to 17, further comprising the steps of:

recirculating exhaust gas, exhausted from the combustion chamber, to the intake air system;

regulating an amount of exhaust gas recirculated to the intake air system; and the step of calculating the combustible component quantity of intake air comprises eliminating an adverse affect of the recirculated exhaust gas on the calculation result on the basis of the regulated amount of the exhaust gas.

28. The method of controlling the engine according to 27, wherein:

the step of eliminating an adverse affect on the calculation result of the combustible component quantity allows the step of calculating the combustible component quantity to be executed on the basis of the detected value appearing when the amount of exhaust gas to be recirculated is zeroed.

29. The method of controlling the engine according to 17, wherein:

the step of detecting the engine parameters comprises detecting at least one of a temperature of the engine oil and a corresponding value representing the temperature of the engine oil to provide a temperature detection value; and the step of calculating the combustible component quantity of intake air comprises calculating at least one of a mixing ratio of combustible components, mixed to the engine oil, and a corresponding value representing the mixing ratio on the basis of the combustible component quantity and the temperature detection value.

30. The method of controlling the engine according to 29, wherein:

the step of eliminating the adverse affect on the calculation result of the combustible component quantity comprises executing at least one of increasing an amount of intake air drawn to the combustion chamber, increasing a temperature of the engine oil, limiting the fuel injection quantity and regulating at timing, at which the fuel injection valve executes the fuel injection, on the basis of at least one of the mixing ratio of the combustible components, the temperature of the engine oil and the corresponding value representing the temperature of the engine oil for thereby preventing an increase in a quantity of combustible components in the engine oil.

31. The method of controlling the engine according to 29, wherein:

the step of eliminating the adverse affect on the calculation result of the combustible component quantity comprises executing at least one of limiting a rotational speed of the engine and limiting an output torque of the engine on the basis of at least one of the mixing ratio of the combustible components, the temperature of the engine oil and the corresponding value representing the temperature of the engine oil for thereby taking a measure against a lubrication defect of the engine oil.

32. The method of controlling the engine according to 29, wherein:

the step of eliminating the adverse affect on the calculation result of the combustible component quantity comprises executing limiting at least one of an intake air quantity of the engine and a fuel injection quantity, on the basis of at least one of the mixing ratio of the combustible components, the temperature of the engine oil and the corresponding value representing the temperature of the engine oil for thereby suppressing an excess of an output torque of the engine.

* * * * *